ns010642810B2

United States Patent
Ting

(10) Patent No.: US 10,642,810 B2
(45) Date of Patent: May 5, 2020

(54) UNBIASED SPACE-SAVING DATA SKETCHES FOR ESTIMATING DISAGGREGATED SUBSET SUMS AND ESTIMATING FREQUENT ITEMS

(71) Applicant: Tableau Software, Inc., Seattle, WA (US)

(72) Inventor: Daniel Ting, Seattle, WA (US)

(73) Assignee: Tableau Software, Inc., Seattle, WA (US)

( * ) Notice: Subject to any disclaimer, the term of this patent is extended or adjusted under 35 U.S.C. 154(b) by 179 days.

(21) Appl. No.: 15/900,730

(22) Filed: Feb. 20, 2018

(65) Prior Publication Data

US 2018/0239792 A1  Aug. 23, 2018

Related U.S. Application Data

(60) Provisional application No. 62/460,709, filed on Feb. 17, 2017.

(51) Int. Cl.
| | |
|---|---|
| *G06F 17/30* | (2006.01) |
| *G06F 16/22* | (2019.01) |
| *G06N 7/00* | (2006.01) |
| *G06F 16/2453* | (2019.01) |
| *G06F 16/2455* | (2019.01) |

(52) U.S. Cl.
CPC ...... *G06F 16/2272* (2019.01); *G06F 16/2453* (2019.01); *G06F 16/2455* (2019.01); *G06N 7/005* (2013.01)

(58) Field of Classification Search
CPC .................................................. G06F 16/2272
See application file for complete search history.

(56) References Cited

U.S. PATENT DOCUMENTS

| | | | | |
|---|---|---|---|---|
| 2018/0046656 | A1* | 2/2018 | Woulfe | G06F 16/9027 |
| 2018/0089287 | A1* | 3/2018 | Haggie | G06F 3/0481 |

OTHER PUBLICATIONS

Huang, Qun, and Patrick PC Lee. "Ld-sketch: A distributed sketching design for accurate and scalable anomaly detection in network data streams." IEEE INFOCOM 2014-IEEE Conference on Computer Communications. IEEE, 2014. (Year: 2014).*

(Continued)

*Primary Examiner* — Usmaan Saeed
*Assistant Examiner* — William P Bartlett
(74) *Attorney, Agent, or Firm* — Morgan, Lewis & Bockius LLP

(57) ABSTRACT

A process creates a data sketch for a data set with many rows. A user selects data fields from the data source. The process allocates storage for N bins, where each bin has storage space for a key value and an associated counter value (which is initialized to zero). The process sequentially accesses the rows from the data source (e.g., as a stream). For each row, the process computes a respective key value using data values for the selected data fields. When the respective key value matches a key value for a respective bin, the process increments the counter value for the respective bin. Otherwise, the process identifies a respective bin with a smallest counter value c. The process increments the counter value of the respective bin, and with probability $1/(1+c)$, replaces the key value of the respective bin with the respective key value.

20 Claims, 13 Drawing Sheets

(56) References Cited

OTHER PUBLICATIONS

Cormode, Graham, and Marios Hadjieleftheriou. "Finding frequent items in data streams." Proceedings of the VLDB Endowment 1.2 (2008): 1530-1541. (Year: 2008).*

Liu, Hongyan, Yuan Lin, and Jiawei Han. "Methods for mining frequent items in data streams: an overview." Knowledge and information systems 26.1 (2011): 1-30. (Year: 2011).*

* cited by examiner

Algorithm 1 Space-Saving algorithms
- Maintain an $m$ list of $(item, count)$ pairs initialized to have count 0.
- For each new row in the stream, let $x_{new}$ be its item and increment the corresponding counter if the item is in the list. Otherwise, find the pair $(x_{min}, \hat{N}_{min})$ with the smallest count. Increment the counter and replace the item label with $x_{new}$ with probability $p$.
- For the original Space Saving algorithm $p = 1$. For unbiased count estimates $p = 1/(\hat{N}_{min} + 1)$.

Figure 4A

| Notation | Definition |
|---|---|
| $t$ | Number of rows encountered or time |
| $\hat{N}_i(t)$ | Estimate for item $i$ at time $t$ |
| $\hat{N}_{min}(t)$ | Count in the smallest bin at time $t$ |
| $n_i, n_{tot}$ | True count for item $i$ and total over all items |
| $\hat{N}_S, n_S$ | Estimated and true total count of items in $S$ |
| $\mathbf{N}, \mathbf{n}$ | Vector of estimated and true counts |
| $p_i$ | Relative frequency $n_i/n_{tot}$ of item $i$ |
| $m$ | Number of bins in sketch |
| $Z_i$ | Binary indicator if item $i$ is a label in the sketch |
| $\pi_i$ | Probability of inclusion $P(Z_i = 1)$ |
| $C_S$ | Number of items from set $S$ in the sketch |

Figure 4B

UNBIASED SPACE-SAVING DATA SKETCHES FOR ESTIMATING DISAGGREGATED SUBSET SUMS AND ESTIMATING FREQUENT ITEMS

RELATED APPLICATIONS

This application claims priority to U.S. Provisional Application Ser. No. 62/460,709, filed Feb. 17, 2017, entitled "Data Sketches for Disaggregated Subset Sum Estimation," which is incorporated by reference herein in its entirety.

TECHNICAL FIELD

The disclosed implementations relate generally to data sketches for summarizing data and more specifically to systems and methods that implement novel unbiased data sketches.

BACKGROUND

When analyzing massive data sets, even simple operations such as computing a sum or a mean are costly and time consuming. These simple operations are frequently performed by people investigating the data interactively, asking a series of questions about the data. In addition, automated systems must monitor or collect a multitude of statistics.

Data sketching algorithms enable the information in these massive data sets to be efficiently processed, stored, and queried. This allows them to be applied, for example, in real-time systems, both for ingesting massive data streams or for interactive analysis.

In order to achieve this efficiency, sketches are designed to only answer a specific class of questions, and there is typically error in the answer. In other words, a data sketch is a form of lossy compression on the original data. A person must choose what information to lose from the original data. A good sketch makes efficient use of the data so that the errors are minimized while having the flexibility to answer a broad range of questions of interest. Some sketches, such as Hyper-Log Log, are constrained to answer very specific questions with extremely little memory. On the other end of the spectrum, sampling-based methods, such as coordinated sampling, are able to answer many questions about the original data, but at the cost of far more space to achieve the same approximation error.

Many data analysis problems consist of a simple aggregation over some filtering and group by conditions, such as SELECT sum(metric), dimensions
FROM table
WHERE filters
GROUP BY dimensions This problem has several variations that depend on what is known about the possible queries and what is known about the data before the sketch is constructed. For problems in which there is no GROUP BY clause and the set of possible filter conditions are known before the sketch is constructed, counting sketches such as the CountMin sketch and AMS sketch are appropriate. When the filters and group by dimensions are unknown and arbitrary, the problem is the subset sum estimation problem. Sampling methods such as priority sampling can be used in some cases. The sampling methods work by exploiting a measure of importance for each row and sampling important rows with higher probability. For example, when computing a sum, the rows containing large values contribute more to the sum and should be retained in the sample.

The disaggregated subset sum estimation problem is a more difficult variant, where there is little to no information about row importance and only a small amount of information about the queries. For example, many user metrics, such as the number of clicks, are computed as aggregations over some event stream where each event has the same weight (i.e., 1) and hence, the same importance. Filters and group by conditions can be arbitrary, except for a small restriction that one cannot query at a granularity finer than the specified unit of analysis. In the click example, the finest granularity may be at the user level. One is allowed to query over arbitrary subsets of users but cannot query a subset of a single user's clicks. The data is "disaggregated" because the relevant per unit metric is split across multiple rows. As used herein, something at the smallest unit of analysis may be referred to as an "item" to distinguish it from one row in the data source.

Because pre-aggregating to compute per unit metrics does not reduce the amount of relevant information, it follows that the best accuracy one can achieve is to first pre-aggregate and then apply a sketch for subset sum estimation. This operation, however, is extremely expensive, especially as the number of units is often large. Examples of units include (user, advertisement id) pairs for ad click prediction and (source IP, destination IP) pairs for network flow metrics. Each of these have trillions or more possible units.

Several sketches based on sampling have been proposed that attempt to address the disaggregated subset sum problem. These include the bottom-k sketch, which samples items uniformly at random, the class of "Net-Flow" sketches, and the Sample and Hold sketches. These proposed solutions, however, are not always accurate, and can also be slow and/or resource intensive. Therefore, an alternative solution is needed that is efficient and produces accurate results.

SUMMARY

This disclosure provides a new data sketch for processing massive data sets. It addresses two common problems: 1) computing a sum given arbitrary filter conditions and 2) identifying the frequent items or heavy hitters in a data set. For the first problem, the sketch provides unbiased estimates with high accuracy. The sketch handles the challenging scenario where the data is disaggregated. Computing the per unit metric of interest requires an expensive aggregation. For example, the metric of interest may be total clicks per user while the raw data is a click stream with multiple rows per user. The new sketch is thus suitable for use in a wide range of applications, including computing historical click through rates for ad prediction, reporting user metrics from event streams, and measuring network traffic for IP flows.

The sketch has provably good properties, which is also verified empirically. These good properties are for both disaggregated subset sum estimation and frequent item problems. On i.i.d. (independent and identically distributed) data, the sketch not only picks out the frequent items but also gives strongly consistent estimates for the proportion of each frequent item. The resulting sketch asymptotically draws a probability proportional to sample size, which is optimal for estimating the sum over the data. For non i.i.d. data, the new sketch typically does much better than random sampling for the frequent item problem and never does worse. For subset sum estimation, even for pathological sequences, the variance is close to that of an optimal sampling design. Empirically, despite the disadvantage of operating on disaggregated data, the disclosed method matches or beats priority sampling, and performs orders of magnitude better on skewed data compared to uniform sampling. The data sketch also has extensions that allow it to be used in combining multiple data sets, in distributed systems, and for time decayed aggregation.

In accordance with some implementations, a method computes data sketches for data sets. Typically, the data sets are very large, so data sketches are created in order to quickly answer certain questions about the data set. In some instances, the data set is streaming, and the process runs in real-time as data rows are received. In some instances of receiving streaming data, the data is buffered.

The method is performed at a computer system having one or more processors and memory. The memory stores one or more programs configured for execution by the one or more processors. Based on the types of questions expected to be asked about a specific data source, certain data fields are selected from the data source. The data source has many rows, and in some implementations additional rows are created while the process is running. Depending on the desired accuracy for the data sketch, the process determines a number N of bins for aggregating rows of the data source. The process then allocates storage (e.g., volatile and/or non-volatile memory) for N bins, where each bin includes storage space for a key value and an associated counter value. The counter values are initialized to zero. In some implementations, each bin also includes storage space for a hash value (a hash of the key value).

The method sequentially processes the plurality of rows from the data source. For each row, the process computes a respective key value for the respective row using data values for the selected plurality of data fields in the respective row. When the respective key value matches a key value for a respective bin, the process increments the counter value for the respective bin. When the respective key value does not match any bin key value and there exists one or more bins having a counter value of zero, the process (1) selects a respective bin having a counter value of zero; (2) sets the key value of the respective bin to be the respective key value; and (3) sets the counter value of the respective bin to be one. When the respective key value does not match any bin key value and all of the N bins have non-zero counter values, the process (1) identifies a respective bin with a smallest counter value c; (2) increments the counter value of the respective bin; and (3) with probability $1/(1+c)$, replaces the key value of the respective bin with the respective key value (therefore, with probability $c/(1+c)$, the key value of the respective bin is unchanged).

In some instances, after creating a data sketch, the process receives a query from a client to identify M frequent items from the N bins, where M is a positive integer less than N. In response to receiving the query, the process selects M of the bins having the largest counter values and returns the key values of the selected M bins to the client.

In some instances, after creating a data sketch, the process receives a query from a client to estimate the number of rows from the data source satisfying a user-specified filter condition. In response to receiving the query, the process (1) determines a subset of the bins whose key values satisfy the user-specified filter condition; (2) computes the sum of the counter values for the bins in the determined subset; and (3) returns, to the client, the sum as an estimate of the number of rows from the data source satisfying the filter condition.

In some implementations, determining the number N of bins for aggregating rows of the data source includes calculating a minimum number of bins needed based on user-specified parameters. In some implementations, the process receives user specification of an error limit $\varepsilon$ for estimating subset sums for the data set and receives a user estimate P of a fraction of the rows in the data set that will satisfy typical subset sum filters. In some implementations, the process selects the number N to be a positive integer satisfying $$N \geq \frac{1}{P\varepsilon^2}.$$

The key values can be stored in the bins in various ways. For example, suppose the selected data fields are $f_1, f_2, \ldots, f_k$, and assume that $f_i(r)$ specifies the $f_i$ data field value for the row r for $i=1, 2, \ldots, k$. In some implementations, the respective key value for the respective row is the concatenation $f_1(r)+f_2(r)+ \ldots +f_k(r)$. In this case, $f_i(r)$ casts the corresponding data field value as a string when the data type of the data field $f_i$ is not a string. In some implementations, the key value is a k-tuple $(f_1(r), f_2(r), \ldots, f_k(r))$.

In some implementations, key values are compared by computing hash values and comparing the hash values. In this case, the hash value for a bin is typically stored with the bin. Matching a respective key value to a key value for a respective bin includes computing a respective hash value of the respective key value and comparing the respective hash value to bin hash values.

Some implementations allow grouping of data values to specify bins. For example, suppose data is being tracked for people, and one of the key fields is age. In some implementations, a distinct bin would be needed for every distinct age value. However, some implementations allowing grouping of ages into age ranges (e.g., 0-19, 20-24, 25-29, . . . ). Note, however, that when the data is grouped in this way, the created data sketch could not answer questions based on ages that did not match these ranges (e.g., it would not be possible to answer questions for a single specific age or an age range like 27-32, which does not align with the stored data in the sketch). In addition to ranges, some implementations allow arbitrary grouping of data values. These are examples where the method includes partitioning data values for a first data field (of the selected plurality of data fields) into a plurality of distinct partitions. Each partition consists of a respective list or range of data values. In this case, matching the respective key value to a respective bin value includes (1) identifying the data value of the first data field in the respective key value; (2) identifying the data value of the first data field in the respective bin key value; and (3) determining that the identified data values are in a same partition.

In accordance with some implementations, a method computes data sketches for data sets. In some implementations, the data sketch compute counts, as described above. For example, the data may represent user clicks on web page advertisements. In other cases, however, the data sketch tracks aggregated data for a numeric data field, such as sales or profit. In one example, data tracking advertisement selection by users tracks the length of time users spend on an advertisement rather than just a count of clicks.

In accordance with some implementations, a method computes data sketches for data from one or more data sources. The method is performed at a computer system having one or more processors and memory. The memory stores one or more programs configured for execution by the one or more processors. A user selects a plurality of data fields from a data source and also selects a summation data field. The user-selected plurality of fields define key values for each row, and the summation data is the data field to be aggregated. The summation data field has a numeric data type. The process determines the number N of bins for aggregating rows of the data source and allocates storage (in volatile and/or non-volatile memory) for N bins. Each bin includes storage space for a key value and an associated magnitude, with the associated magnitude initialized to zero. In some implementations, each bin also includes storage space for a hash value.

The method sequentially processes the plurality of rows in the data source. In some implementations, the rows are read from a data source such as an SQL database, a flat file, a JSON file, an XML file, or multiple files in a distributed storage system (e.g., Hadoop). In some implementations, the data source is streaming, and the rows are processed as they are received. In some implementations, data from a streaming data source is buffered to account for the case where data is received more quickly than it can be processed.

For each row, the method computes a respective key value using data values for the selected plurality of data fields in the respective row and identifies a respective summation value s, which is the data value for the summation data field in the respective row. When the respective key value matches a key value for a respective bin, the method adds the respective summation value to the magnitude for the respective bin. When the respective key value does not match any bin key value and there exists one or more bins having a magnitude of zero, the process (1) selects a respective bin having a magnitude of zero; (2) sets the key value of the respective bin to be the respective key value; and (3) sets the magnitude of the respective bin to be the respective summation value.

When the respective key value does not match any bin key value and all of the N bins have non-zero magnitudes, the method (1) identifies a respective bin with a smallest magnitude c; (2) adds the respective summation value to the magnitude of the respective bin; and (3) with probability s/(s+c), replaces the key value of the respective bin with the respective key value.

In accordance with some implementations, a computer system has one or more computing devices. Each computing device has one or more processors and memory. The memory stores one or more programs configured for execution by the one or more processors, and the one or more programs comprise instructions for performing any of the methods described herein.

In some implementations, a computing device includes one or more processors and memory. The memory stores one or more programs. The programs are configured for execution by the one or more processors. The one or more programs include instructions for performing any of the methods described herein.

In some implementations, a non-transitory computer readable storage medium stores one or more programs configured for execution by a computing device having one or more processors and memory. The one or more programs include instructions for performing any of the methods described herein.

Thus methods, systems, and graphical user interfaces are disclosed for building data sketches that enable a user quickly get answers about a large data set.

BRIEF DESCRIPTION OF THE DRAWINGS

For a better understanding of the aforementioned systems and methods, as well as additional systems methods for implementing data sketches, reference should be made to the Description of Implementations below, in conjunction with the following drawings in which like reference numerals refer to corresponding parts throughout the figures.

FIG. 4A provides a brief summary of the method used by the disclosed Unbiased Space-Saving sketch, in accordance with some implementations.

FIG. 4B provides a table of notation used for describing the Unbiased Space-Saving sketch, in accordance with some implementations.

Figure 1:
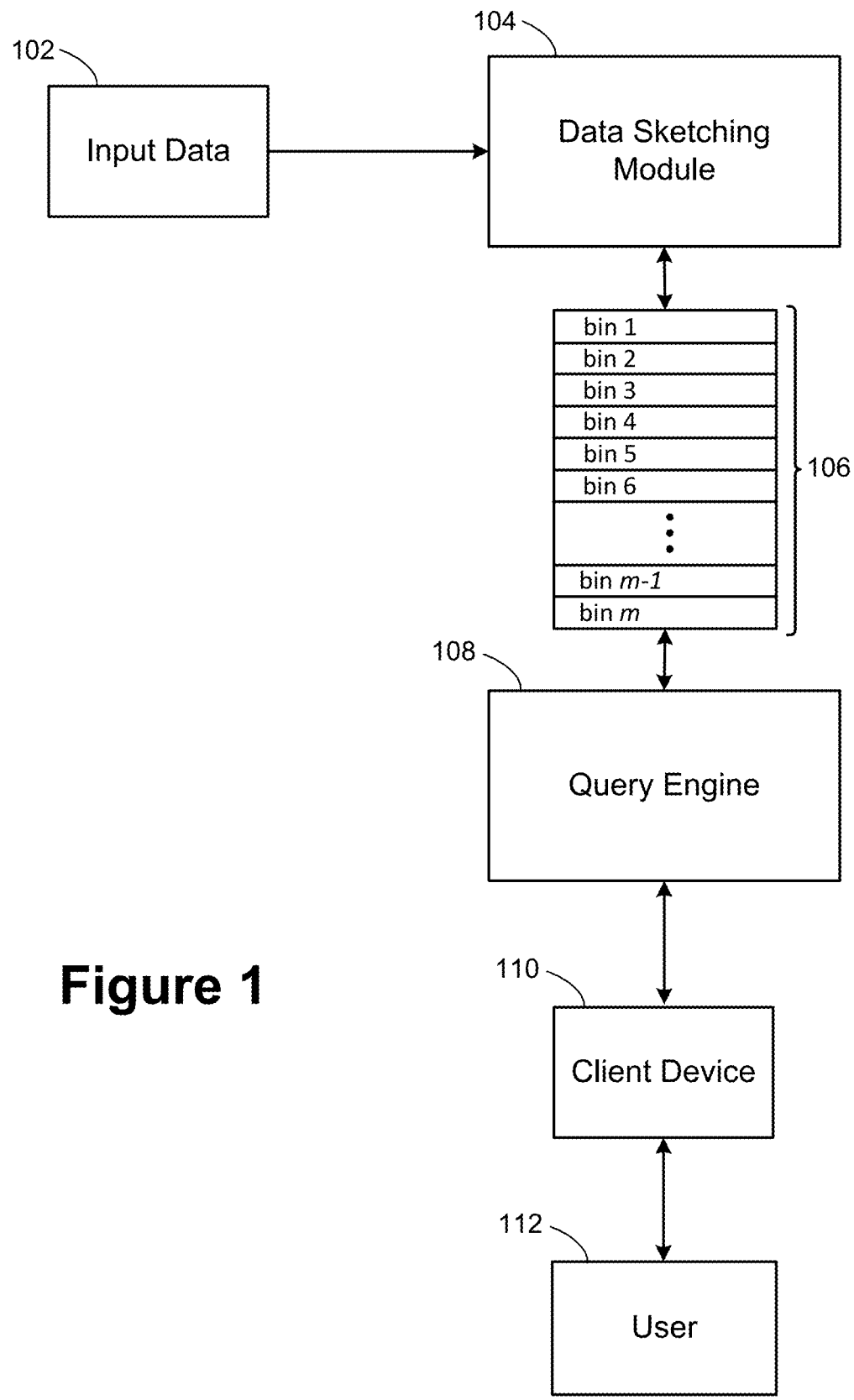
FIG. 1 illustrates schematically the general context in which a data sketch is constructed and used, in accordance with some implementations.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

The new data sketch introduced here is sometimes referred to as Unbiased Space-Saving. This data sketch simultaneously addresses two common data analysis problems: the disaggregated subset sum problem and the frequent item problem. This makes the sketch more flexible than previous sketches, which address only one problem or the other. Furthermore, the new sketch is efficient, providing state of the art performance on the disaggregated subset sum problem. On i.i.d. streams, the new data sketch has a stronger provable consistency guarantee for frequent item count estimation than previous results, and on non-i.i.d. streams the new data sketch performs well both theoretically and empirically. In addition, an error estimator with good coverage properties allows a user to assess the quality of a disaggregated subset sum result.

The disaggregated subset sum estimation problem is a more challenging variant of the subset sum estimation problem (the common problem of computing a sum or mean over a dataset with arbitrary filtering conditions). In the disaggregated subset sum problem, the data is "disaggregated" so that a per item metric of interest is split across multiple rows. For example, in an advertisement click stream, the data may arrive as a stream of single clicks. Each click is associated with an advertisement, but the metric of interest is typically the total number of clicks per advertisement. The frequent item problem is the problem of identifying the heavy hitters or most frequent items in a dataset. Several sketches exist for each of these individual problems. For example, the Sample and Hold methods address the disaggregated subset sum estimation problem. Frequent item sketches include the Space Saving sketch and the Lossy Counting sketch.

The new sketch introduced here is an extension of the Space Saving frequent item sketch, and has much stronger frequent item estimation properties than Sample and Hold. In particular, unlike Sample and Hold, the Unbiased Space-Saving Sketch guarantees that a frequent item will eventually be included in the sketch with probability 1 and that the proportion of times the frequent item appears will be consistently estimated for i.i.d. streams. In contrast to frequent item sketches that are biased, the Unbiased Space-Saving sketch gives unbiased estimates for any subset sum, including subsets containing no frequent items.

Analysis of the disclosed Unbiased Space-Saving sketch has three parts. The first part describes the operation of the Unbiased Space Saving sketch. The second part describes generalizations of the basic sketch, obtained from understanding the properties of the sketch and the mechanisms by which it works. The third part shows the theoretical and empirical results establishing the correctness and efficiency of the sketch for answering the problems of interest.

The generalizations include allowing multiple sketches to be merged so that information from multiple data sets may be combined. This also enables the disclosed techniques to be applied in a distributed system. Other generalizations include the ability to handle signed and real-valued updates as well as time-decayed aggregation. Empirical tests of the sketch have been reviewed using both synthetic and real advertisement prediction data. Perhaps surprisingly, the Unbiased Space-Saving sketch even outperforms priority sampling, a method that requires pre-aggregated data.

The Unbiased Space-Saving sketch throws away even less information than previous sketches. This allows the sketch to match the accuracy of priority sampling, a nearly optimal subset sum estimation algorithm, which uses pre-aggregated data. In some cases, the Unbiased Space-Saving sketch achieves better accuracy despite being computed on disaggregated data.

The disaggregated subset sum problem has many applications. These include machine learning and advertisement prediction, analyzing network data, detecting distributed denial of service attacks, database query optimization and join size estimation, as well as analyzing web users' activity logs or other business intelligence applications.

In advertisement prediction, the historical click-through rate and other historical data are among the most powerful features for future advertisement clicks. Because there is no historical data for newly created ads, one may use historical click data or impression data for previous ads with similar attributes, such as the same advertiser or product category. In join size estimation, the sketch enables estimation of the size under the arbitrary filtering conditions that a user might impose.

The Unbiased Space-Saving sketch can also be naturally applied to hierarchical aggregation problems. For network traffic data, IP addresses are arranged hierarchically. A network administrator may be interested in individual nodes that receive or generate an excess of traffic or may be interested in aggregated traffic statistics on a subnet. Because a disaggregated subset sum sketch can handle arbitrary group by conditions, it can compute the next level in a hierarchy.

The frequent item or heavy hitter problem is related to the disaggregated subset sum problem. The Unbiased Space-Saving sketch is an extension of Space-Saving sketch, which is a frequent item sketch. Like the disaggregated subset sum problem, frequent item sketches are computed with respect to a unit of analysis that requires a partial aggregation of the data. However, only functions of the most frequent items are of interest. Most frequent item sketches are deterministic and have deterministic guarantees on both the identification of frequent items and the error in the counts of individual items. However, since counts in frequent item sketches are biased, further aggregation on the sketch can lead to large errors when bias accumulates. The Unbiased Space-Saving sketch applies randomization to achieve unbiased count estimates. This allows it to be used in subset sum queries. Furthermore, it maintains good frequent item estimation properties.

FIG. 1 illustrates schematically the general context in which a data sketch is constructed and used, in accordance with some implementations. A data sketching module 104 receives input data 102, which may be a data stream or retrieved from a stored data source. In some implementations, data from the input data is placed into a data buffer as rows of data are received or retrieved. The data sketching module 104 manages a fixed collection 106 of m bins, where m is a positive integer. In some implementations, m is generally in the range of 100,000 to 1,000,000. In the Unbiased Space-Saving sketch, the number m of bins is determined at the outset before processing rows from the input data 102, and the number of bins remains fixed during the processing. In general, the number of bins is significantly less than the number of rows in the input data. For example, 10 million rows of data and 100,000 bins. Each bin includes a key and a count (or magnitude), as explained in more detail below in FIGS. 5, 7, and 9.

Using the data in the bins 106, a query engine 108 is able to answer specific types of questions about the data. In some instances, queries against the bins 106 are not processed until all of the data is processed (e.g., the input stream 102 is closed). In other instances, queries are allowed against the bins while the data sketching module 104 is still processing rows from the input data 102. The specific types of questions supported by the Unbiased Space-Saving sketch are estimating a subset sum or identifying frequent items.

The query engine receives a query from a client device 110, which may be entered by a user 112. In some instances, a query is generated at the client device by an automated process (e.g., generated by a data analysis application 222 according to user specification of data visualization characteristics).

Figure 2:
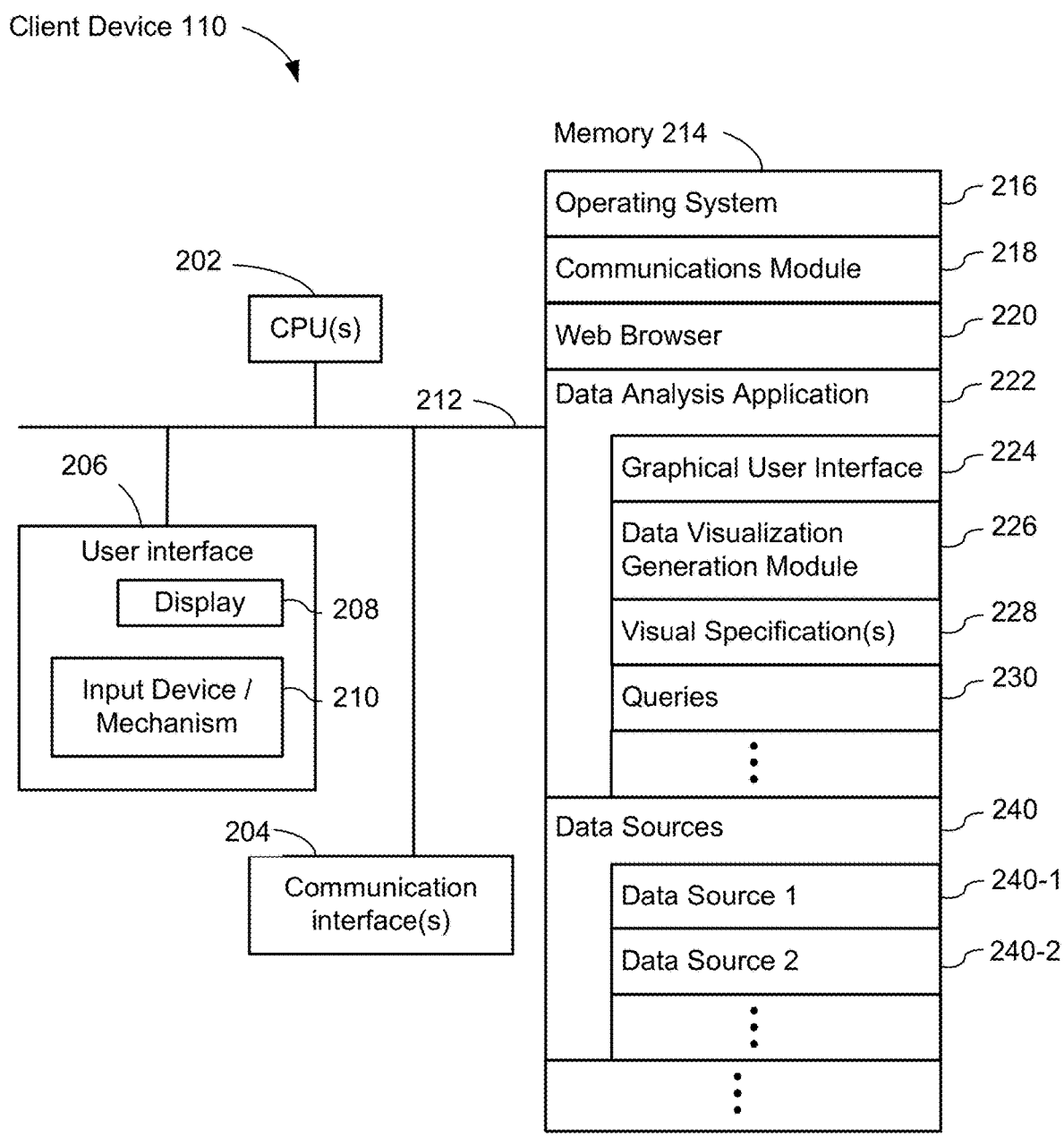
FIG. 2 is a block diagram of a client device according to some implementations.

FIG. 2 is a block diagram illustrating a client device 110 in accordance with some implementations. A client device may also be referred to as a computing device or a personal device. Various examples of a client device 110 include a desktop computer, a laptop computer, a tablet computer, a smart phone, and other computing devices that have a processor capable of running user applications (e.g., a data analysis application 222). The client device 110 typically includes one or more processing units/cores (CPUs) 202 for executing modules, programs, and/or instructions stored in the memory 214 and thereby performing processing operations; one or more network or other communications interfaces 204; memory 214; and one or more communication buses 212 for interconnecting these components. The communication buses 212 may include circuitry that interconnects and controls communications between system components.

The client device 110 includes a user interface 206 comprising a display device 208 and one or more input devices or mechanisms 210. In some implementations, the input device/mechanism includes a keyboard. In some implementations, the input device/mechanism includes a "soft" keyboard, which is displayed as needed on the display device 208, enabling a user to "press keys" that appear on the display 208. In some implementations, the display 208 and input device/mechanism 210 comprise a touch screen display (also called a touch sensitive display).

In some implementations, the memory 214 includes high-speed random access memory, such as DRAM, SRAM, DDR RAM or other random access solid state memory devices. In some implementations, the memory 214 includes non-volatile memory, such as one or more magnetic disk storage devices, optical disk storage devices, flash memory devices, or other non-volatile solid state storage devices. In some implementations, the memory 214 includes one or more storage devices remotely located from the CPUs 202. The memory 214, or alternately the non-volatile memory device(s) within the memory 214, comprises a non-transitory computer readable storage medium. In some implementations, the memory 214, or the computer readable storage medium of the memory 214, stores the following programs, modules, and data structures, or a subset thereof:

- an operating system 216, which includes procedures for handling various basic system services and for performing hardware dependent tasks;
- a communications module 218, which is used for connecting the client device 110 to other computers and devices via the one or more communication network interfaces 204 (wired or wireless) and one or more communication networks, such as the Internet, other wide area networks, local area networks, metropolitan area networks, and so on;
- a web browser 220 (or other application capable of displaying web pages), which enables a user to communicate over a network with remote computers or devices;
- a data analysis application 222, which provides a graphical user interface 224 for a user to construct visual graphics. For example, a user selects one or more data sources 240 (which may be stored on the client device 110 or stored remotely), selects data fields from the data source(s), and uses the selected fields to define a visual graphic. In some implementations, the information the user provides is stored as a visual specification 228. The data analysis application 222 includes a data visualization generation module 226, which takes the user input (e.g., the visual specification 228), and generates a corresponding visual graphic (also referred to as a "data visualization" or a "data viz"). The data analysis application 222 then displays the generated visual graphic in the user interface 224. In some implementations, the data analysis application 222 executes as a standalone application (e.g., a desktop application). In some implementations, the data analysis application 222 executes within the web browser 220 or another application using web pages provided by a web server. In some implementations, the data analysis application 222 sends one or more queries 230 to an external computer system 300 to retrieve data. In some instances, data is retrieved from one or more data sources 240 by a database engine 340 running on the computer system 300. In some instances, data is retrieved from the data bins 106 that were populated by a data sketch;
- zero or more data sources 240 (e.g., a first data source 240-1 and a second data source 240-2), which are used by the data analysis application 222. In some implementations, the data sources are stored as spreadsheet files, CSV files, XML files, or flat files, or stored in a relational database.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 214 stores a subset of the modules and data structures identified above. Furthermore, the memory 214 may store additional modules or data structures not described above.

Although FIG. 2 shows a computing device 200, FIG. 2 is intended more as a functional description of the various features that may be present rather than as a structural schematic of the implementations described herein. In practice, and as recognized by those of ordinary skill in the art, items shown separately could be combined and some items could be separated.

Figure 3:
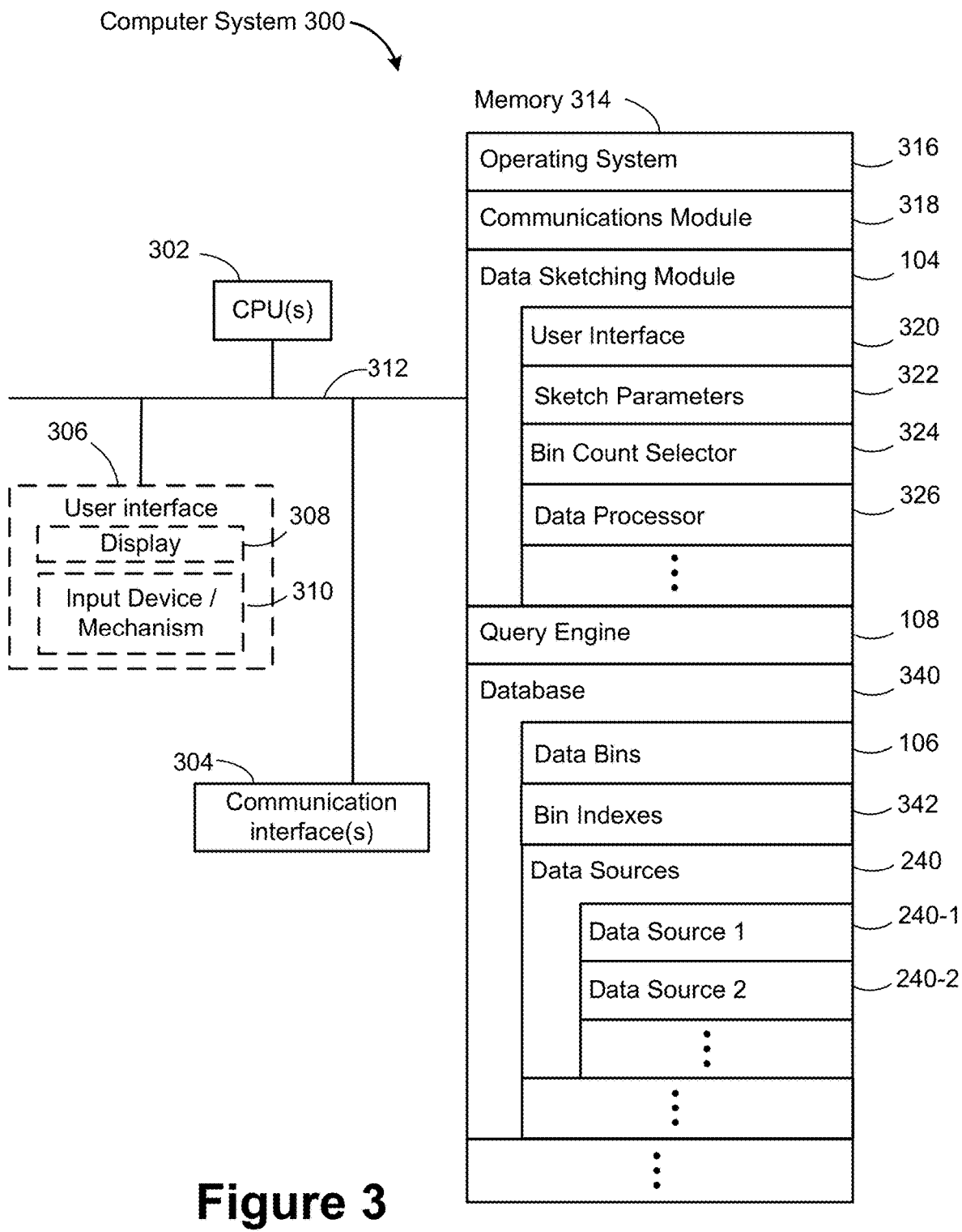
FIG. 3 is a block diagram of a computer system according to some implementations.

FIG. 3 is a block diagram of a computer system 300 in accordance with some implementations. A computer system 300 includes one or more individual computers. The computer system 300 may host one or more databases 340 and/or may provide various executable applications or modules. A computer system 300 typically includes one or more processing units/cores (CPUs) 302, one or more network interfaces 304, memory 314, and one or more communication buses 312 for interconnecting these components. In some implementations, the computer system 300 includes a user interface 306, which includes a display device 308 and one or more input devices 310, such as a keyboard and a mouse. In some implementations, the communication buses 312 includes circuitry (sometimes called a chipset) that interconnects and controls communications between system components.

In some implementations, the memory 314 includes high-speed random access memory, such as DRAM, SRAM, DDR RAM, or other random access solid state memory devices, and may include non-volatile memory, such as one or more magnetic disk storage devices, optical disk storage devices, flash memory devices, or other non-volatile solid state storage devices. In some implementations, the memory 314 includes one or more storage devices remotely located from the CPUs 302. The memory 314, or alternatively the non-volatile memory device(s) within the memory 314, comprises a non-transitory computer readable storage medium.

In some implementations, the memory 314 or the computer readable storage medium of the memory 314 stores the following programs, modules, and data structures, or a subset thereof:

an operating system 316, which includes procedures for handling various basic system services and for performing hardware dependent tasks;

a network communication module 318, which is used for connecting the computer system 300 to other computers via the one or more communication network interfaces 304 (wired or wireless) and one or more communication networks, such as the Internet, other wide area networks, local area networks, metropolitan area networks, and so on;

a web server (such as an HTTP server), which receives web requests from users and responds by providing responsive web pages or other resources;

a data analysis web application, which may be downloaded and executed by a web browser 220 on a user's computing device 110. In general, a data analysis web application has the same functionality as a desktop data analysis application 222, but provides the flexibility of access from any device at any location with network connectivity, and does not require installation and maintenance. In some implementations, the data analysis web application includes various software modules to perform certain tasks, including a user interface module, a data retrieval module, a data visualization generation module 226, a relationship identification module, and a relationship builder module. In some implementations, the data analysis web application 322 uses a visual specification 228, as described above with respect to FIG. 2;

a data sketching module 104, which receives rows of data from input data 102 (e.g., a streaming source or a stored data source 240) and builds a data sketch. The data for the data sketch is stored in an array of bins 106. In some implementations, the data sketching module includes a user interface 320, which enables users to specify sketch parameters 322 for a data sketch (e.g., the data source, which fields will be used to build the bin keys, and whether the sketch is computing counts or sums of a specific numeric data field). In some implementations, the number of bins is one of the user-specified sketch parameters. In other implementations, a bin count selector 324 determines the number of bins based on known data about the data source and/or other user-specified sketch parameters (e.g., the maximum allowable error for the data sketch). The data sketching module 104 includes a data processor 326, which processes individual rows of data from the input data 102 to update the data in the bins 106;

a query engine 108, which receives queries 230, and generates responsive results from the data bins 106. The queries 230 are limited to specific types of questions based on the stored data sketch (e.g., subset sums and frequent items according to the data fields selected for the sketch). For example, to respond to a subset sum query 230, the query engine identifies which bins match the selection criteria, and then sums the counts of the matching bins; and one or more databases 340, which store data that may be used by a data analysis application 222, used by a data analysis web application, and/or used by the query engine 108 to answer specific questions using data in the bins 106 of a data sketch. Note that a single database may store bins 106 for a plurality of distinct data sketches. When there are multiple data sketches, they may be based on the same input data 102, or based on distinct input data sets. Typically, there are one or more bin indexes 342 for the data bins 106. For example, for efficiency of matching a new row to existing bins, there is a first bin index 342 based on the selected key fields. In this way, finding the matching bin (if there is one) is performed by a quick lookup (which is O(log(m)) rather than O(m)). In some implementations, an index is based on the hash values of the key values. Some implementations also maintain an index on the count for each bin, which enables quick lookup of the bin with the smallest count. In some implementations, looking up the bin with the lowest count handles both the case where there is an empty bin (count=0) as well as the case where the lowest count is non-zero. See FIG. 7, steps 718 and 720.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 314 stores a subset of the modules and data structures identified above. Furthermore, the memory 314 may store additional modules or data structures not described above.

Although FIG. 3 shows a computer system 300, FIG. 3 is intended more as a functional description of the various features that may be present rather than as a structural schematic of the implementations described herein. In practice, and as recognized by those of ordinary skill in the art, items shown separately could be combined and some items could be separated. In addition, some of the programs, functions, procedures, or data shown above with respect to a computer system 300 may be stored on a client device 110. In some implementations, the functionality and/or data may be allocated between a client device 110 and a computing system 300. FIG. 3 need not represent a single physical device. In some implementations, the functionality of the computer system 300 is allocated across multiple physical devices. As used herein, references to a "computer system" include various groups, collections, or arrays of individual computing devices, which collectively provide the described functionality, and the physical servers need not be physically collocated (e.g., the individual physical devices could be spread throughout the United States or throughout the world).

FIG. 4A provides a brief summary of the method used by the disclosed Unbiased Space-Saving sketch and FIG. 4B provides a table of notation used for describing the Unbiased Space-Saving sketch. Each of the created m bins has an "item" and a "count." As used herein, an "item" is also referred to as a "key value" and the "count" is also referred to as a "counter value." In general, multiple rows from the input data 102 will be aggregated into the same bin. If there are N total rows in the input data 102, then on average each bin will end up with a counter value of N/m. Using the Unbiased Space-Saving sketch, every row is counted in a bin, so at the end, the sum of all the counter values is N.

As each row is processed (e.g., from a stream), the key value for the new row is matched to an existing bin if possible (e.g., using an index on the key value). When there is a match, the counter value is incremented. If there is no match, then a bin with smallest counter value is found. The counter value for this bin is incremented, even though the key value for the bin does not match the key value for the new row. In some cases, the key value for the bin is replaced by the key value for the new row. The replacement occurs probabilistically. In particular, if the smallest counter value is c, the bin label (the key value) is replaced with probability 1/(1+c). This can be done, for example, by generating a pseudo-random decimal number q in the range [0,1] and performing the replacement when q≤1/(1+c).

FIG. 4B provides some notation that is used in conjunction with the Unbiased Space-Saving sketch. As used in this notation a set S is a set of items. Note that not all of the items in S are necessarily represented in the bins. Each item that does appear in a bin is generally overestimated, and items from the input data 102 are underestimated when they do not appear in any bin. However, when computing a subset sum (which is a goal of this sketch), a given set S typically includes both items that are overestimated and items that are underestimated, so overall the estimate for the sum is good.

The original Space-Saving sketch is sometimes referred to as Deterministic Space-Saving to differentiate it from the disclosed Unbiased Space-Saving sketch, which incorporates some randomized operations. Consider first the case where the metric of interest is the count for each item. The Deterministic Space-Saving sketch works by maintaining a list of m bins labeled by distinct items. A new row with item i increments the counter for item i if it is in the sketch. Otherwise, the smallest bin is incremented, and its label is changed to i (deterministically). The disclosed Unbiased Space-Saving sketch introduces a key modification, which makes it unbiased. If $\hat{N}_{min}$ is the count for the smallest bin, only change the label with probability $1/(\hat{N}_{min}+1)$.

This probabilistic updating of the bin label provably yields unbiased counts. Specifically, let x be an item, let $\hat{N}_x(t)$ denote the estimate for the count of x at time t, and let $\hat{N}_{min}(t)$ be the count in the bin with the smallest count. The expected increment to $N_x(t)$ is 1 if x is the next item and 0 otherwise. Suppose x is the next item. If x is the label for one of the bins, then the counter for this bin is incremented by exactly 1, and the counter for this bin is the estimate for $N_x(t+1)$. If x is not the label for one of the bins, $N_x(t)$ is incremented by $\hat{N}_{min}(t)+1$ with probability $1/(\hat{N}_{min}(t)+1)$, for an expected increment of 1 (i.e., $N_x(t+1)=N_x(t)+1$. Now suppose x is not the next item. The estimated count $\hat{N}_x(t)$ can only be modified if x is the label for the bin with the smallest count. It is incremented with probability $\hat{N}_x(t)/(\hat{N}_x(t)+1)$. Otherwise $\hat{N}_x(t+1)$ is set to 0, with probability $1/(\hat{N}_x(t)+1)$. Therefore, the expected value for $\hat{N}_x(t+1)$ is [probability of increment]*$(\hat{N}_x(t)+1)$+[probability of being set to 0]*0. This is equal to $[\hat{N}_x(t)/(\hat{N}_x(t)+1)]*(\hat{N}_x(t)+1)+[1/(\hat{N}_x(t)+1)]*0=\hat{N}_x(t)$. That is, the expected value does not change when the new item is not x.

We note that although given any fixed item x, the estimate of its count is unbiased, each stored pair often contains an overestimate of the item's count. This occurs because any item with a positive count will receive a downward biased estimate of 0 when it is not in the sketch. Conversely, when an item does appear in the list, the count is biased upwards.

Figure 5:
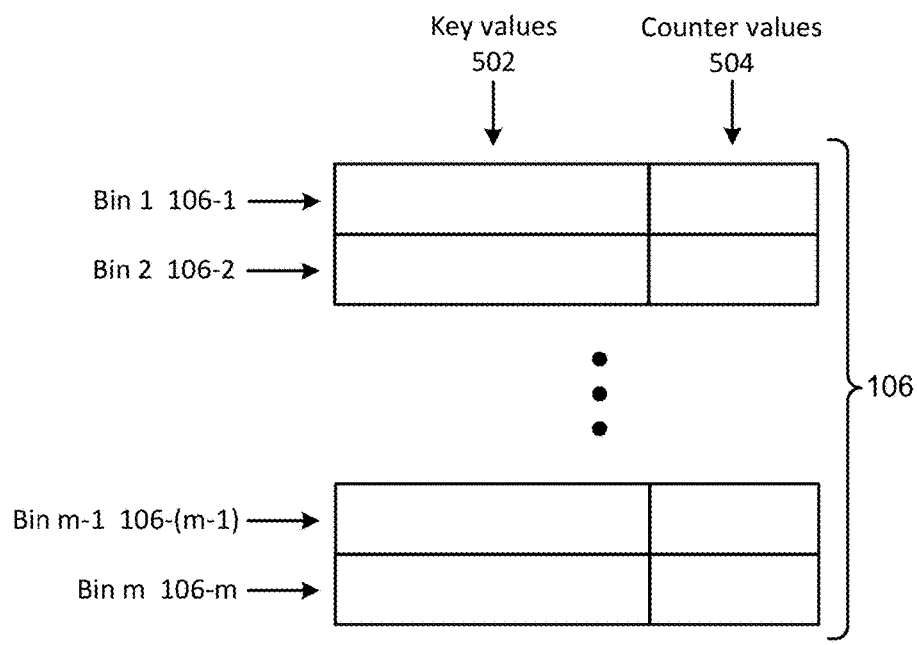
FIG. 5 illustrates a bin structure used by the Unbiased Space-Saving sketch, in accordance with some implementations.

FIG. 5 illustrates the structure of bins used by the Unbiased Space-Saving sketch, in accordance with some implementations. The bins 106 consist of m distinct bins, bin 1 106-1 through bin m 106-m. Each bin has a key value 502 and a counter value 504. Implementations store the key values 502 in various ways, such as a string that concatenates the values for each of the selected data fields. In some implementations, the key values 502 are stored as k-tuples of the individual field values. For example, if the data field are $f_1, f_2, \ldots, f_k$, then the key value for a row r may be stored as $(f_1(r), f_2(r), \ldots, f_k(r))$, where $f_i(r)$ specifies the $f_i$ data field value for the row r for i=1, 2, . . . , k. The counter value is an integer valued field that is initialized to zero. In some implementations (not shown), each bin also includes a hash value, which is a hash of the key value. Typically, the bin key values and/or the bin hash values are indexed for quick lookup.

Figure 6:
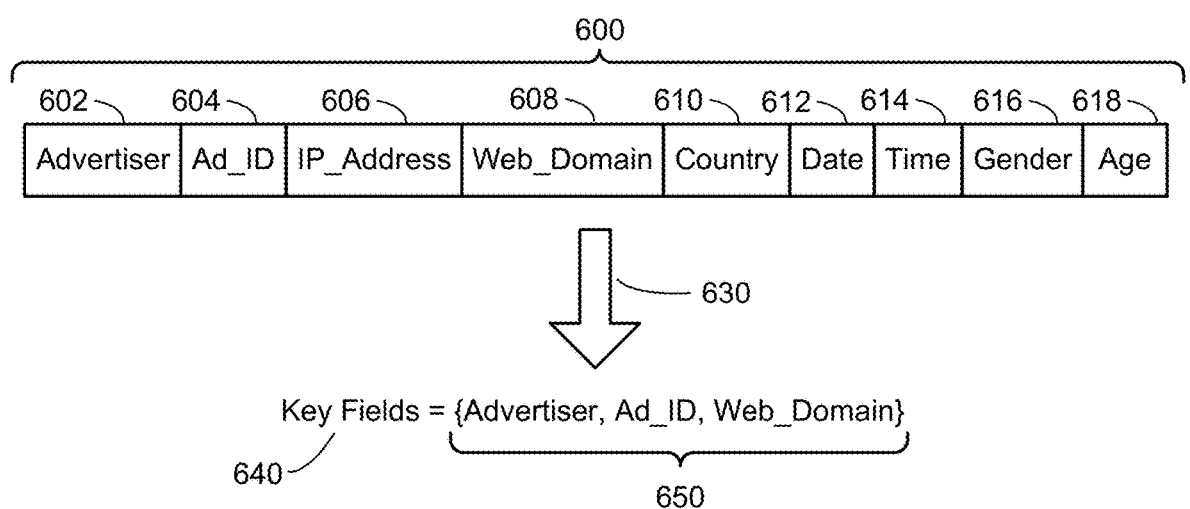
FIG. 6 illustrates available data fields in a data source and selection of a subset of these fields to be used as the key fields used by the Unbiased Space-Saving sketch, in accordance with some implementations.

FIG. 6 illustrates available data fields in a data source and selection of a subset of these fields to be used as the key fields used by the Unbiased Space-Saving sketch, in accordance with some implementations. This data source represents click-through data for online advertising. In this case, the data fields 600 include an Advertiser 602 (e.g., an advertiser code), a unique Ad_ID 604, an IP_Address 606 indicating the IP address of the client device 110 where the click event occurred, and the Web_Domain 608 of the website where the advertisement was clicked. The data source also includes a Country 610, which specifies the country where the click-through event occurred, as well as Date and Time fields 612 and 614, which specify when each click-though event occurred. In some implementations, certain demographic information about the user is also known (or inferred). For example, the Gender 616 and Age 618 may be filled in for rows from this data source.

In some implementations, the data sketching module provides a user interface 320, which enables the user to select (630) which of the data fields will be designated as key fields 640. In some implementations, the selected fields 650 are stored as sketch parameters 322.

Figure 7:
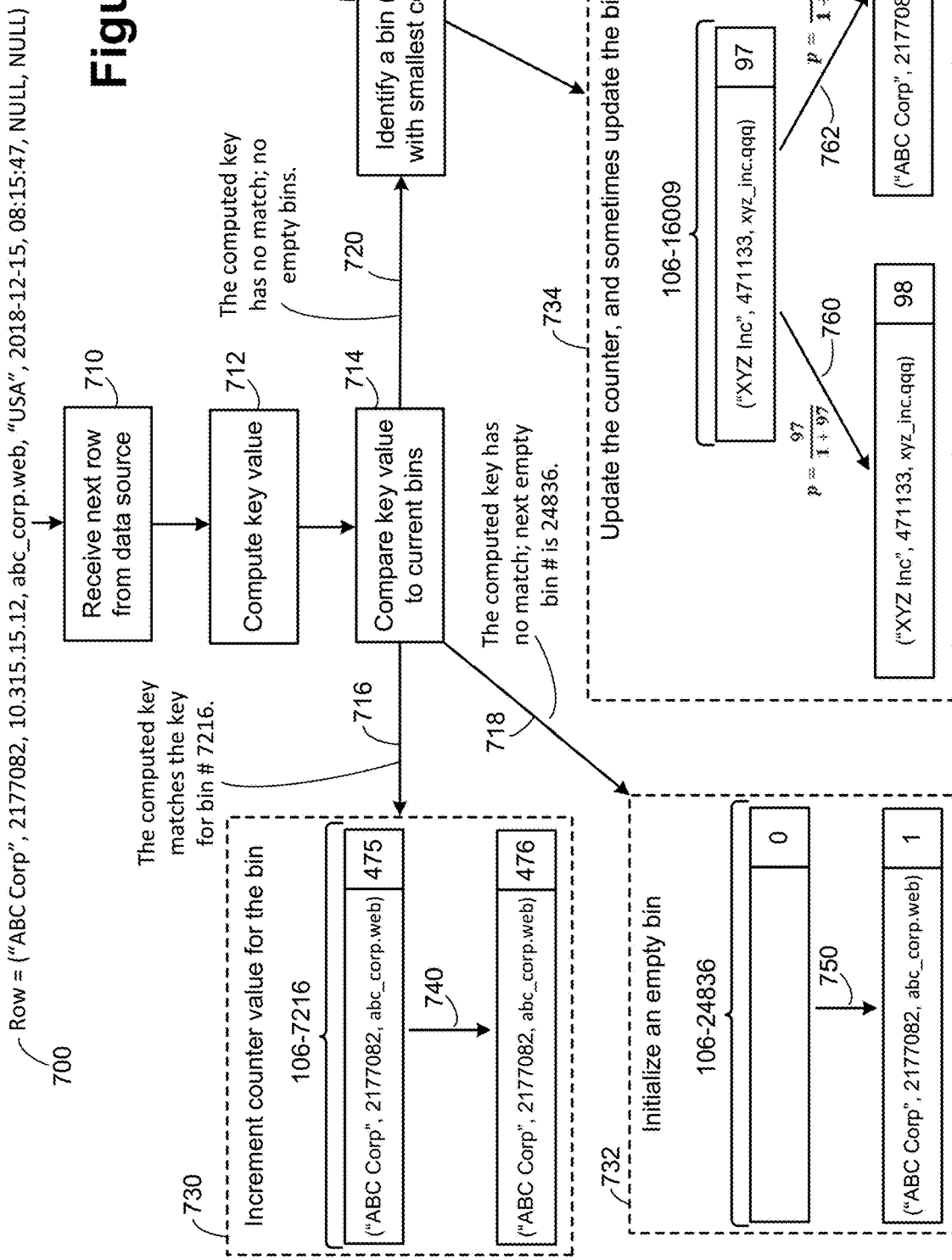
FIG. 7 illustrates building a data sketch in accordance with some implementations.

FIG. 7 illustrates building a data sketch in accordance with some implementations. This example uses the data illustrated in FIG. 6, including rows of data with the data fields 600, and computing key values according to the user selected set of fields 650. A row 700 is received (710) from the data source. The process then computes (712) a key value for the row according to the selected set of fields 650. In this case, the selected set of fields 650 consists of the advertiser, the advertisement ID, and the website address where the ad was displayed. The key value for a row can be stored in various ways, such as an ordered tuple of values (as shown in FIG. 7) or as a concatenated string.

The computed key value for the new row is then compared (714) to the key values in the bins. In some implementations, this comparison uses hash values. Typically, the comparison uses a lookup in a bin index 342. In some instances, the computed key value matches (716) the key value of an existing bin. Note that there is at most one matching bin; when there is a matching bin, the matching bin is updated, so a second bin with the same key value cannot be created. In this example, the matching bin is bin #7216 (identified as 106-7216). In this case, the process increments (730) the counter value for the matched bin. As illustrated, the key value for the bin stays (740) the same and the counter value increases (740) by 1.

When there is no bin matching the key value for the row, there are conceptually two possibilities: either there is at least one empty bin, in which case the new key value is inserted into one of the empty bins; or there are no empty bins, in which case a bin with a least counter value will be updated. These two cases are shown separately in FIG. 7, but functionally they can be combined, as indicated below.

When there is no match and there is an empty bin (i.e., counter value=0), the process selects (718) one of the empty bins (e.g., using a bin index 342 on counter value). In the illustration of FIG. 7, the selected empty bin is bin #24836 (identified as 106-24836). In this case, the process initializes (732) the empty bin. In particular, the process sets (750) the key value of the bin to be the key value of the new row, and sets (750) the counter of the bin to be 1.

In the third case, the key value of the new row does not match (720) any bin and there are (720) no empty bins. In this case, the process identifies (722) a bin with a smallest count. In some implementations, there is an index on counter value, so finding a bin with smallest counter value is a quick operation. In this example, a bin with smallest counter value is bin #16009 (identified as 106-16009), and the counter value for this bin is 97. In this case, the process updates (734) the counter value for the bin and sometimes updates (734) the bin label (the key value). As illustrated in FIG. 7, there are two subcases, which are executed probabilistically. In the first case 760, the key value of the bin is retained, but the counter value is incremented. In this example, the first case is executed with probability p=97/(1+97). More generally, if the smallest bin counter value is c, the probability of executing the first case is p=c/(1+c). This probabilistic execution is determined randomly at runtime (e.g., by generating a random number in the interval [0,1] and executing the first case when the generated random number is ≤97/(1+97). In the second case 762, the key value for the bin is replaced by the key value for the row, and the counter value is incremented. This occurs with probability p=1/(1+97). In both of these cases, the counter value is incremented by one, but only in the second case does the bin label change.

These two cases both appear strange, because there is no assumed relationship between the bin key value and the key value of the new row. In both cases, data for two different key values are being combined. This seems particular strange in the second case 762, where the entire count value of 97 for the original key is "commandeered" for a completely different key value. Despite this apparent strangeness, it yields (provably) high quality results probabilistically for the specific questions that are going to be asked of this data sketch.

FIG. 7 shows processing a single row 700 from the data source, so only one of the three paths (716, 718, or 720) will be executed for the specific row 700. The same process in FIG. 7 is applied to each of the rows from the data source to build the data sketch.

In some implementations, the process to initialize an empty bin and the process to update a non-matching existing bin are combined. Specifically, when there is no matching bin, always look up a bin with a smallest counter value (e.g., using a bin index 342 on the counter values). In some instances, the smallest counter value is zero, and in some instances, it is non-zero. Let c be the counter value for the bin. With probability c/(1+c), increment the counter value without changing the bin label. When the selected bin has a counter value of 0, this probability is 0, so it never occurs. With probability 1/(1+c), update the bin label with the new key value and increment the counter value. When c≠0, this is just as described above. However, when c=0, this probability is 1. Thus, when the bin is empty, the process always updates the label with the ley value of the new row and sets the counter value to be one (i.e., incrementing the previous 0 value).

Figure 8:
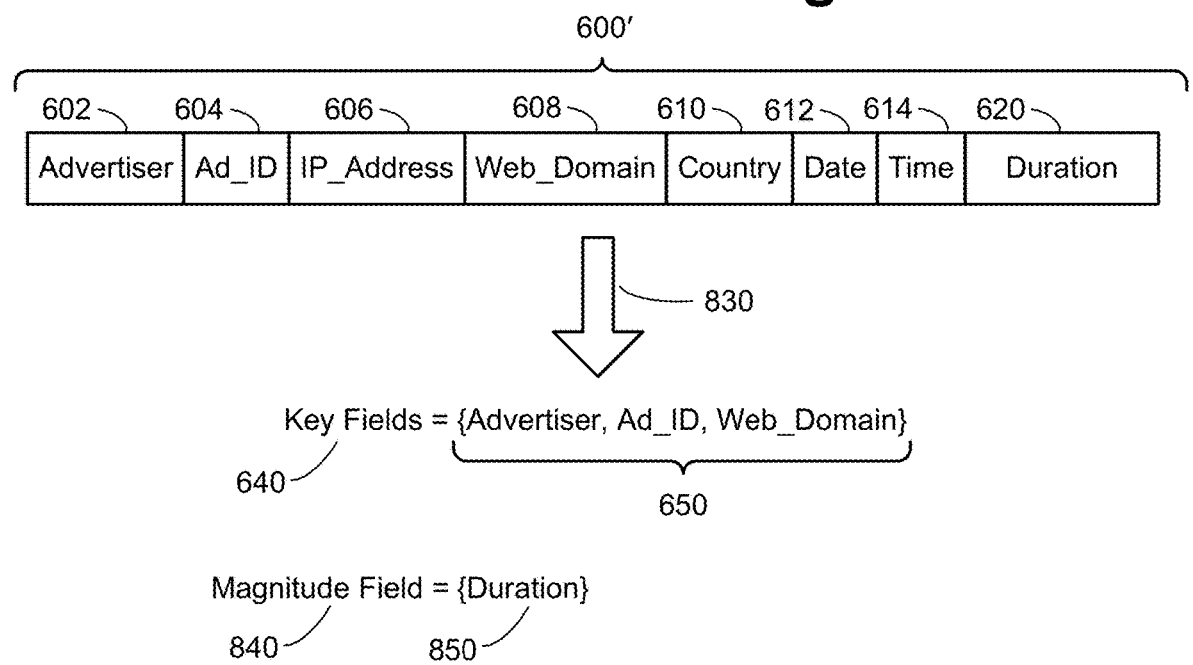
FIG. 8 illustrates available data fields in a data source, selection of a subset of these fields to be used as the key fields used by the Unbiased Space-Saving sketch, and selection of a numeric field for aggregation, in accordance with some implementations.

FIG. 8 illustrates available data fields in a data source, selection of a subset of these fields to be used as the key fields used by the Unbiased Space-Saving sketch, and selection of a numeric field for aggregation, in accordance with some implementations. The data fields 600' include most of the data fields 600 in FIG. 6, plus an additional Duration data field 620, which is a numeric field indicating the length of time a user stayed on the selected advertisement. A user selects the same key fields as in FIG. 6, and specifies that the magnitude field 840 is specified (850) by the Duration data field. This information in FIG. 8 is used in FIG. 9.

Figure 9:
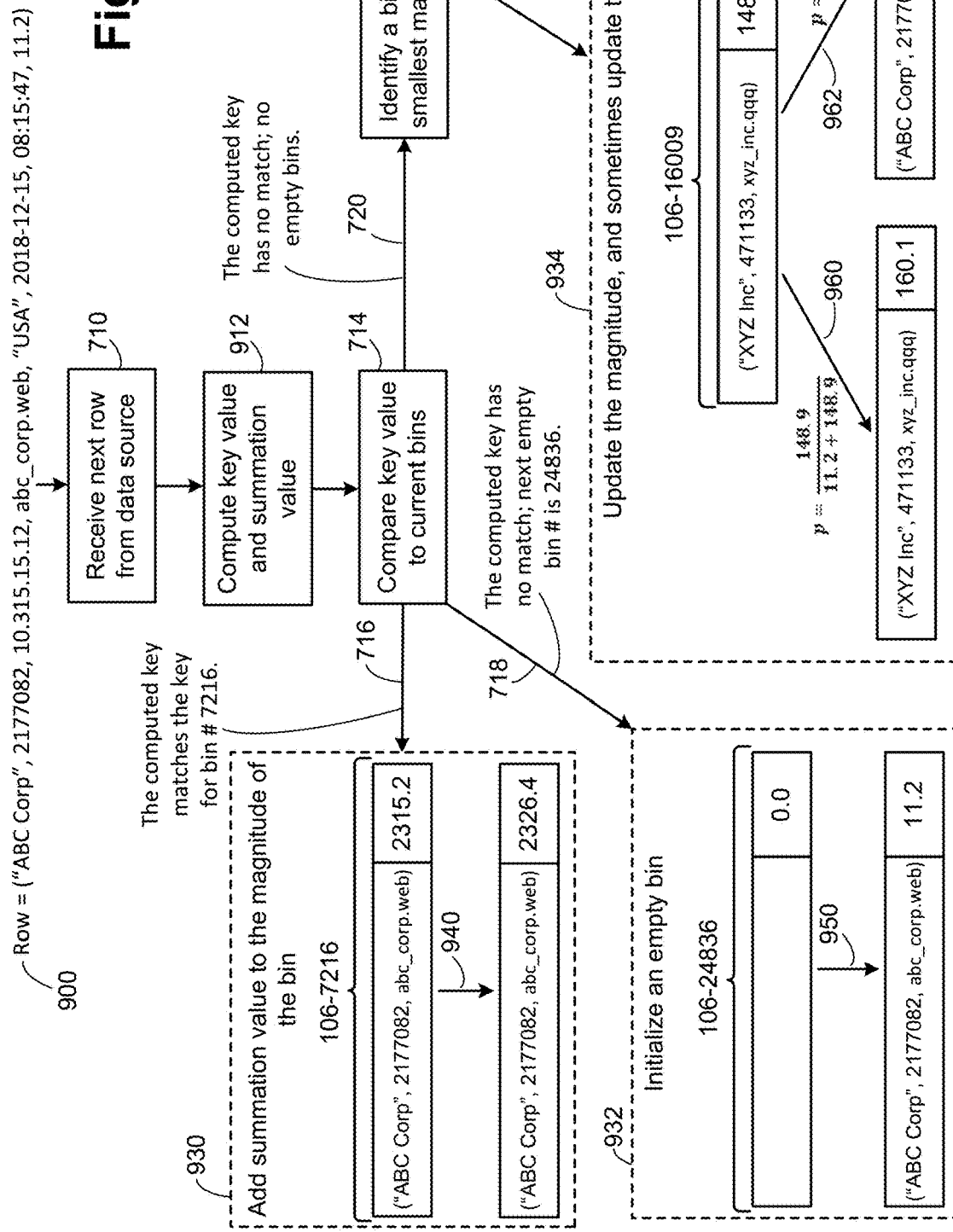
FIG. 9 illustrates building a data sketch in accordance with some implementations.
Figure 10A:
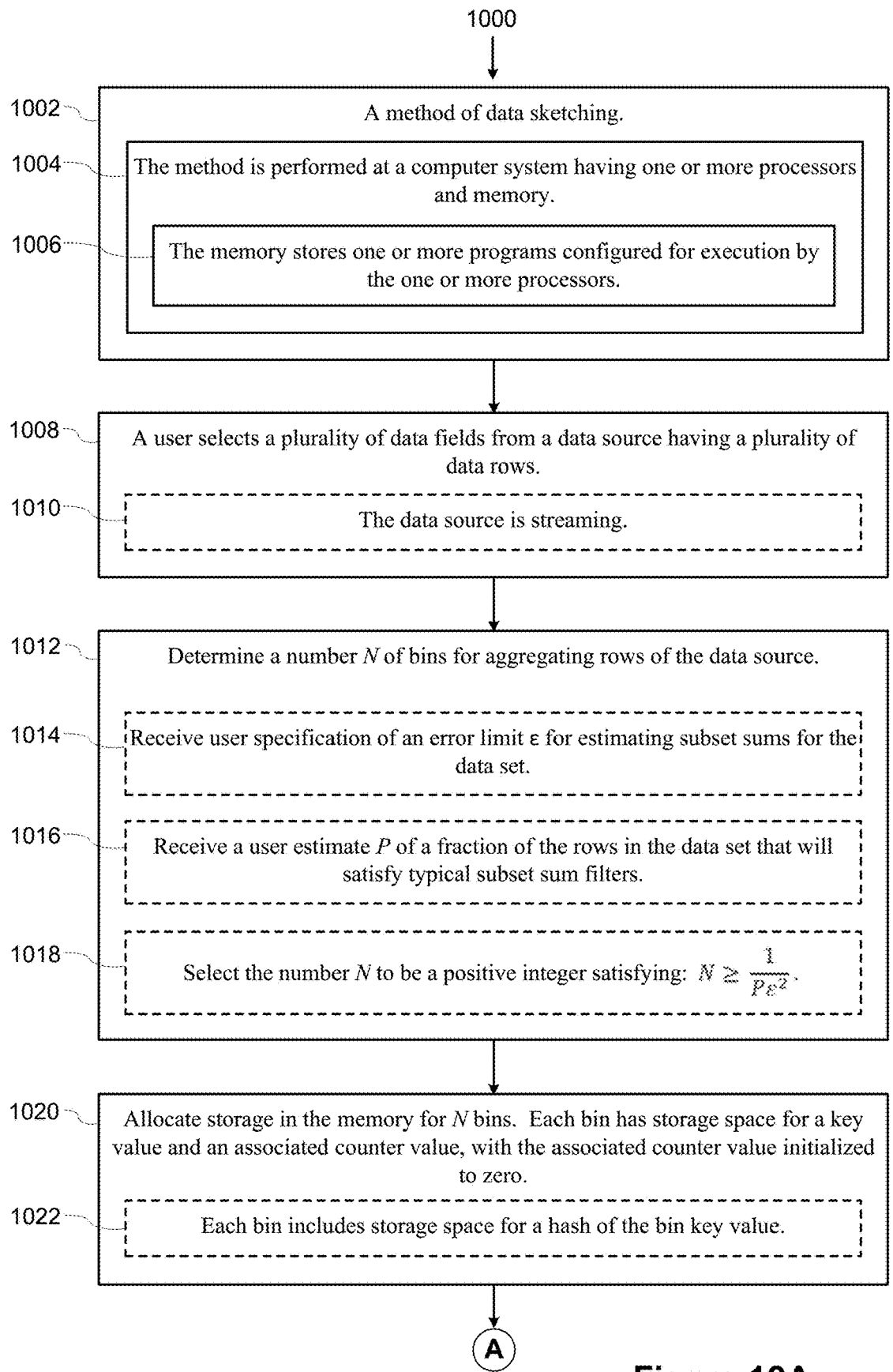
FIGS. 10A-10D provide a flowchart of a process for building and using a data sketch according to some implementations.
Figure 10B:
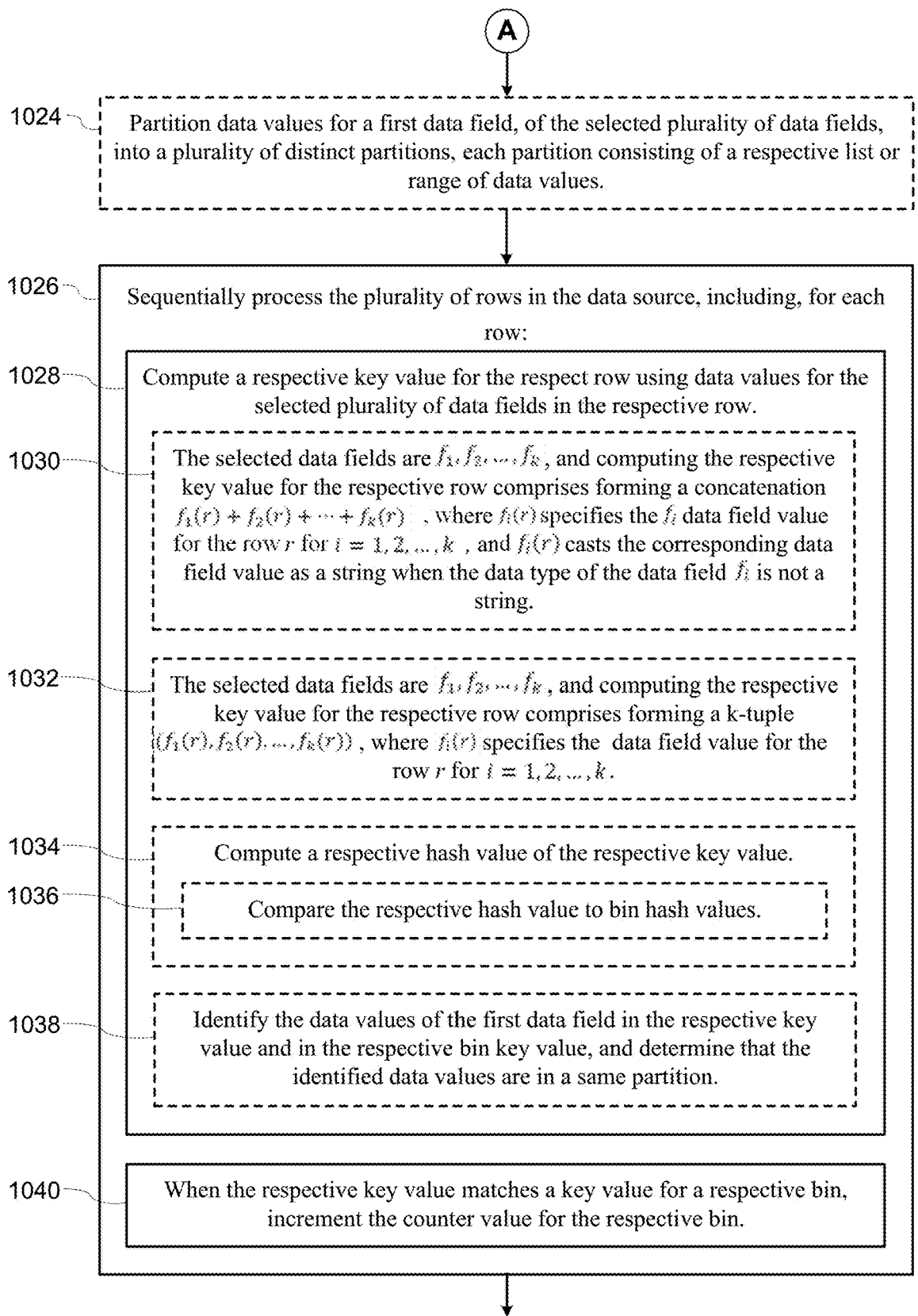
Figure 10C:
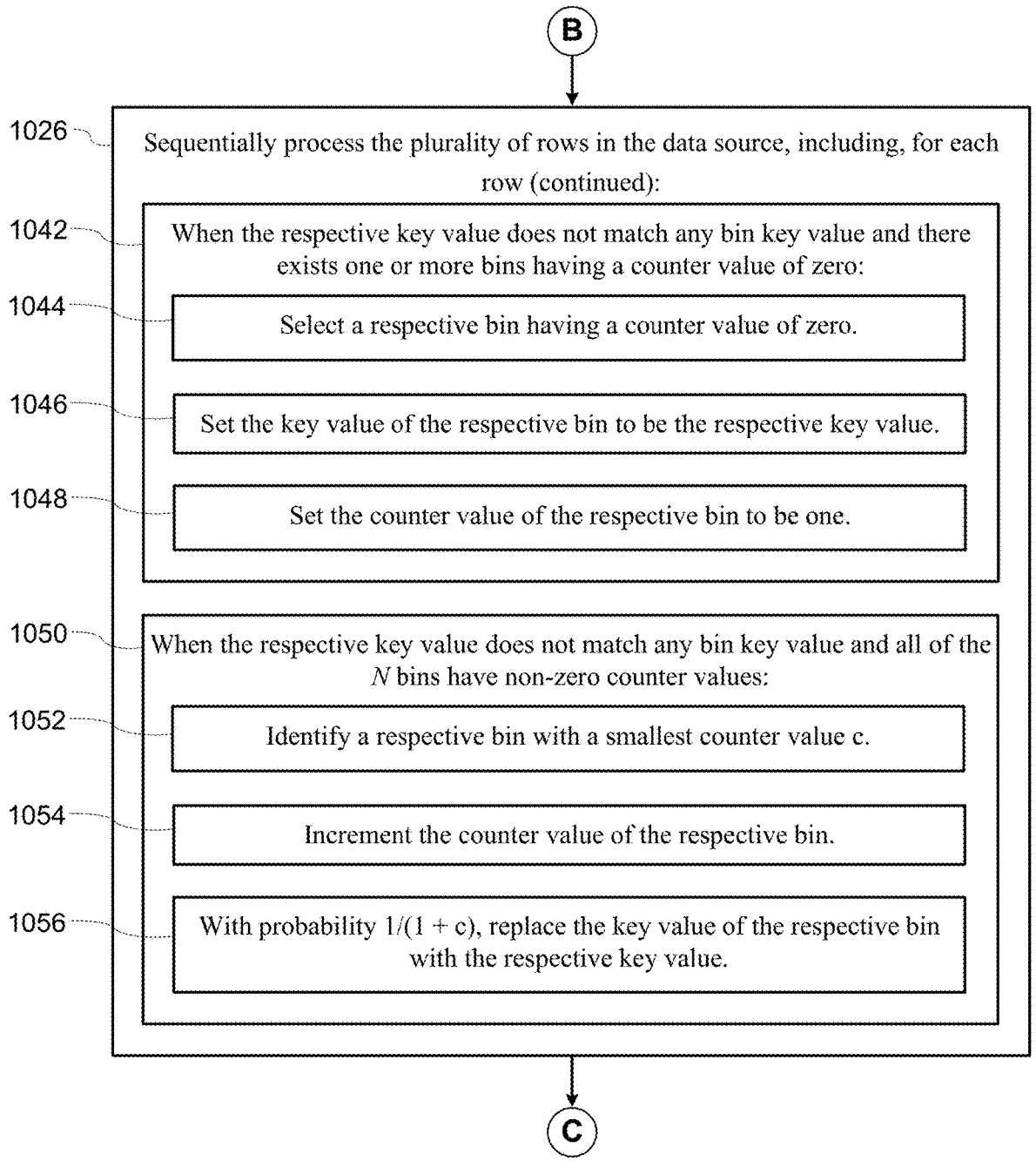
Figure 10D:
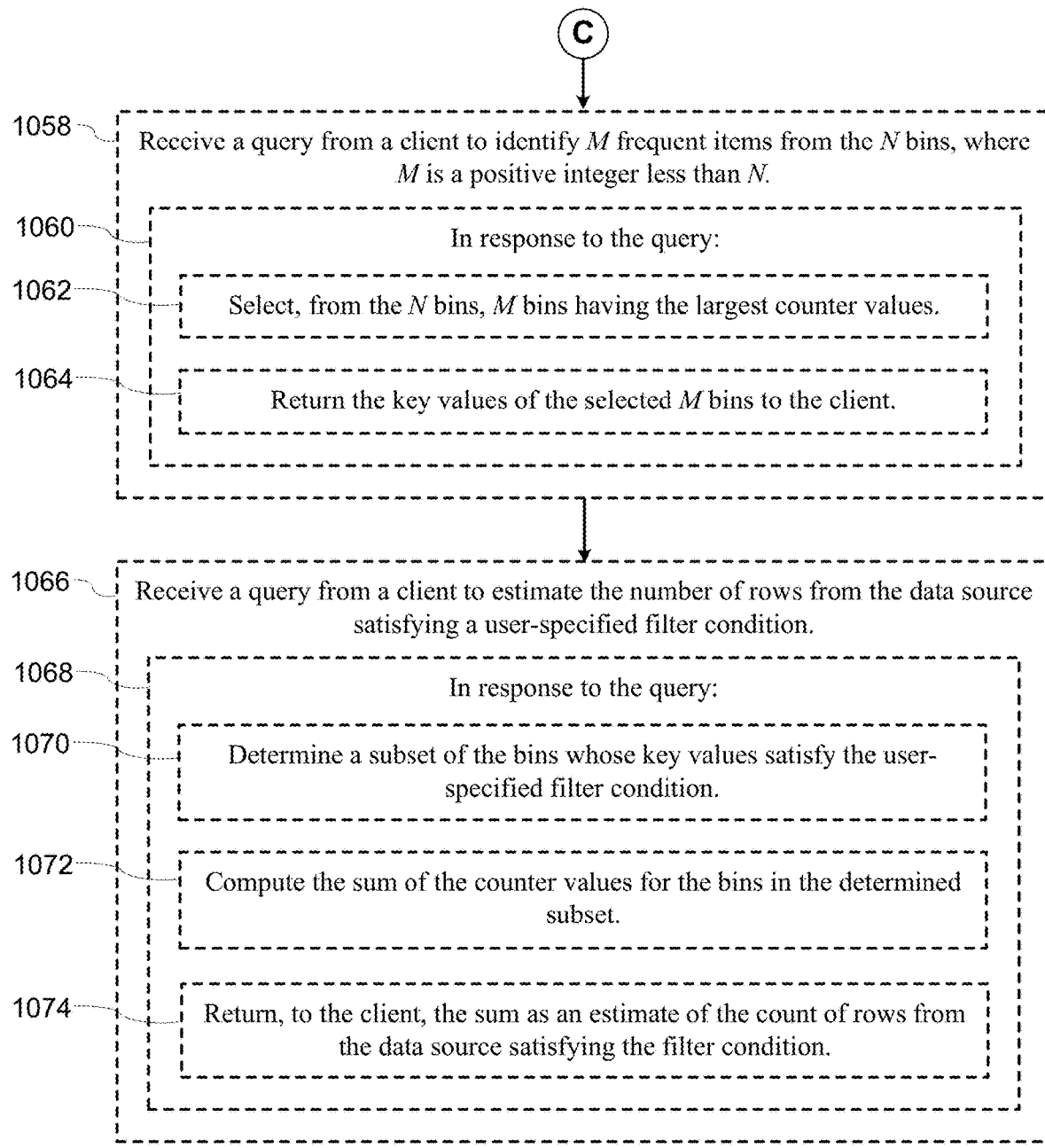

FIG. 9 illustrates building a data sketch in accordance with some implementations. Whereas the data sketch in FIG. 7 computes counts for each bin, FIG. 9 illustrates expanding the Unbiased Space-Saving sketch to compute an aggregate value for each bin. Each bin has storage space allocated for a magnitude rather than a counter value. The aggregation is performed on a numeric data field (here the Duration data field 620). Other common data fields for aggregation are sales, profit, or inventory.

The overall structure in FIG. 9 is the same as FIG. 7, and some of the steps are essentially identical, so these elements retain the numbering from FIG. 7. Here, the input row 900 includes the duration 11.2 (e.g., seconds). In addition to computing (912) the key value for the row 900, the process also determines (912) the summation value. The summation value is the data value in the row for the designated magnitude data field. In this example, the summation value is 11.2.

When the computed key value matches (716) an existing bin, the process adds (930) the summation value to the magnitude of the bin. As illustrated in FIG. 9, the magnitude for the bin changes (940) from 2315.2 to 2326.4.

When the computed key value does not match (718) any bin and there is (718) at least one empty bin, the process selects (718) one of the empty bins and initializes (932) it. Initializing an empty bin includes setting (950) the key value for the bin to be the key value for the row and setting (950) the magnitude of the bin to be the summation value.

When the computed key value does not match (720) any bin and there are (720) no empty bins, the process identifies (922) a bin with a smallest magnitude. In this illustration, the smallest magnitude is 148.9, and bin #16009 is a bin with this magnitude. The process then updates (934) the magnitude for the bin, and sometimes updates (934) the bin label. As in FIG. 7, the "sometimes" occurs probabilistically. The probabilities are computed differently, however. The summation value is used to compute the probability. Whereas each new row in FIG. 7 has a "weight" of 1 (it will add 1 to the counter value for a bin), each row in FIG. 9 has a weight corresponding to the summation value. A row with a very large summation value is much more likely to have its key value overwrite the previous key value. In the illustrated example in FIG. 9, the non-overwrite path 960 occurs with probability 148.9/(11.2+148.9), whereas the overwrite path 962 occurs with probability 11.2/(11.2+148.9). In both of these cases, the process adds the summation value to the magnitude of the bin, and in the overwrite case, the process replaces the former bin key value with the new key value.

More generally, if c is the smallest bin magnitude and s is the summation value for the row, the non-overwrite path 960 has probability $c/(s+c)$ and the overwrite path 962 has probability $s/(s+c)$.

The data sketch illustrated in FIG. 9 can answer questions about the amount of time spent viewing advertisements, and well as which advertisements were most viewed. Note the difference between the sketch in FIG. 7 versus the sketch in FIG. 9: in the first data sketch, the sketch is able to answer questions about the number of clicks on advertisements; in the second data sketch, the sketch is able to answer questions about length of time spent on each advertisement. In some implementations, the data sketching module can create two or more data sketches from the same data source at the same time. For example, some implementations build the data sketches illustrated by FIGS. 7 and 9 at the same time.

FIGS. 10A-10D provide a flowchart of a process 1000 for building (1002) and using (1002) a data sketch according to some implementations. The process is performed (1004) at a computer system having one or more processors and memory. The memory stores (1006) one or more programs configured for execution by the one or more processors.

A user selects (1008) a plurality of data fields from a data source having a plurality of data rows, as illustrated in FIGS. 6 and 8. These are the data fields that specify how to compute the key value for each row of data processed. The selection of these data fields is based on what types of questions the data sketch will be expected to answer. The selected data fields are stored as sketch parameters 342. In some implementations, the data source is (1010) streaming. In some implementations that include a streaming data source, the input data 102 is buffered, which can account for differences between the processing speed of the computer system and the speed at which rows arrive. In some implementations, the data source is already fixed (e.g., a SQL database or a distributed database in Hadoop). In general, data sketching is valuable for very large data sets, so the disclosed process is typically not applied to data sets that are small enough to process arbitrary queries against the raw data quickly.

The first part of the process is to set up the data sketch. In particular, this involves determining (1012) the number N of bins for aggregating rows of the data source. Typically, the number of bins is much smaller than the number of rows of data from the data source. For example, there may be 100 million rows of data from the data source, but only 100 thousand or 500 thousand bins. In some implementations, the user specifies the number of bins for the sketch. In other implementations, the number of bins to allocate is determined based on user-specified sketch parameters 342. For example, in some implementations, the user specifies (1014) an error limit ε for estimating subset sums for the data set. A user may also specify (1016) the fraction P of the rows in the data set that will satisfy typical subset sum filters. If the subset sums might be based on very small subsets, a greater number of bins will be needed to estimate at a given level of accuracy. In some implementations, the number N of bins is determined (1018) using the formula $$N \geq \frac{1}{P\varepsilon^2}.$$

In some instances, determining the number of bins is based on criteria for frequent item estimation. If the sketch will be used for estimating frequent items, then it is useful to have enough bins so that the frequent items will be stored. Based on how the sketch is created, and assuming the rows of data are i.i.d., items that occur in at least Q/N rows have a probability near 1.0 of being included in the sketch, where Q is the total number of rows in the data source and N is the number of bins. Therefore, if Q can be estimated and a user can estimate the minimum size T for an item to be considered frequent, then the number N can be selected to be greater than Q/T.

The process then allocates (1020) storage for N bins. Each bin has storage space for a key value and an associated counter value, with the associated counter value initialized to zero. In some implementations, the bins are initially allocated in volatile memory and later stored into non-volatile memory (e.g., on disk or solid-state storage). In some implementations, the storage is allocated on permanent storage immediately, which is typically cached to increase performance. In some implementations, each bin includes (1022) storage space for a hash of the bin key value. Typically, the key values and/or the hash values are indexed.

In many instances, each distinct data value for any of the key fields creates a new (distinct) key value. However, in some instances, some data values are grouped together, and thus considered part of the same key value. For example, consider a data set representing information about people (e.g., user clicks on advertisements). Assume that for at least some of the rows, data is known about each user's age. By default, each distinct age creates a different key value and thus utilizes a different bin. However, if it is known that all questions about the data will use a designated set of age ranges, those age ranges can be used as the basic unit of a key value. To simplify usage of ranges (or other groupings), some implementations designate a representative value for each range, and use the representative value to compute a key value. For example, if the age ranges are 0-4, 5-9, 10-14, 15-19, etc., some implementations use the smallest age in each range as the representative for the range. In some implementations, the process thus partitions (1024) data values for a first data field, of the selected plurality of data fields, into a plurality of distinct partitions, where each partition consists of a respective list or range of data values.

The disclosed method sequentially processes (1026) the plurality of rows in the data source. For each (1026) row, the process computes (1028) a respective key value for the respective row using data values for the selected plurality of data fields in the respective row, as illustrated in FIGS. 7 and 9. Implementations store key values in various formats. In some implementations, the selected data fields are (1030) $f_1$, $f_2$, ..., $f_k$, and computing the respective key value for the respective row comprises forming (1030) a concatenation $f_1(r)+f_2(r)+ \ldots +f_k(r)$, where $f_i(r)$ specifies the $f_i$ data field value for the row r for i=1, 2, ..., k, and $f_i(r)$ casts the corresponding data field value as a string when the data type of the data field $f_i$ is not a string. Having the respective key value as a string is particularly useful for computing a hash value. In some implementations, the selected data fields are (1032) $f_1, f_2, \ldots, f_k$, and computing the respective key value for the respective row comprises forming (1032) a k-tuple $(f_1(r), f_2(r), \ldots, f_k(r))$, where $f_i(r)$ specifies the $f_i$ data field value for the row r for i=1, 2, ..., k.

In some implementations, the process computes (1034) a respective hash value of the respective key value and compares (1036) the respective hash value to bin hash values.

As indicated above, some implementations enable grouping of data values. In some implementations that enable grouping, a representative value is identified every time a key value is computed. In this case, there is a unique representative for each group, so key values can be computed in the same way that they are computed without grouping. When implementations do not use group representative values, each comparison must determine whether the key value for the received row matches the key value for a bin. This entails identifying (1038) the data value of the first data field in the respective key value, identifying (1038) the data value of the first data field in the respective bin key value, and determining (1038) whether the identified data values are in the same partition.

When the respective key value matches the key value for a respective bin, the process increments (1040) the counter value for the respective bin. This is illustrated by the first path 716 in FIG. 7.

When the respective key value does not match (1042) any bin key value and there exists (1042) one or more bins having a counter value of zero, the process selects (1044) a respective bin having a counter value of zero. The process then sets (1046) the key value of the respective bin to be the respective key value and sets (1048) the counter value of the respective bin to be one. This is illustrated by the second path 718 in FIG. 7.

When the respective key value does not match (1050) any bin key value and all of the N bins have (1050) non-zero counter values, the process identifies (1052) a respective bin with a smallest counter value c. The process increments (1054) the counter value of the respective bin. Then, with probability 1/(1+c), the process replaces (1056) the key value of the respective bin with the respective key value. This is illustrated by the thirdpath 720 in FIG. 7.

The process builds the data sketch by applying these steps to each of the rows from the input data 102. Once the data sketch is built, it can be used to answer specific questions about the data source. The questions that can be answered are determined by the setup of the sketch.

In some instances, the query engine 108 receives a query from a client to identify M frequent items from the N bins, where M is a positive integer less than N. In response (1060) to the query, the query engine 108 selects (1062), from the N bins, M bins having the largest counter values and returns (1064) the key values of the selected M bins to the client.

In some instances, the query engine 108 receives (1066) a query from a client to estimate the number of rows from the data source satisfying a user-specified filter condition. For example, using the data sketch described in FIGS. 6 and 7, the query could ask for the total number of clicks on a specific advertisement or the number of clicks on advertisements for a specific advertiser displayed at a specific website. This specific data sketch could not answer questions related to the IP address of the user, the country of the user, the date or time the clicks occurred, or the gender or age of the user because these data fields were not included in the set of key fields 640.

In response (1068) to the query, the query engine determines (1070) a subset of the bins whose key values satisfy the user-specified filter condition and computes (1072) the sum of the counter values for the bins in the determined subset. Typically, not every key value associated with the user-specified filter condition will be included in the bins. The "missing" key values will be under counted (contributing zero rather a positive count), but the other key values that are stored in bins will be over counted. Probabilistically, the computed total is a good estimate, as long as the number of relevant bins is sufficiently large. The query engine 108 then returns (1074) the sum as an estimate of the count of rows from the data source satisfying the filter condition.

Some implementations support merging two or more data sketches (ones that have the same set of key fields). Merge operations and mergeable sketches are important because they allow a collection of sketches, each answering questions about the subset of data it was constructed on, to be combined to answer questions over all the data. For example, a set of frequent item sketches that give trending news for each country can be combined to give trending news for Europe as well as a multitude of other possible combinations. Another common scenario arises when sketches are aggregated across time. Sketches for clicks may be computed per day, but the final machine learning feature may combine the last 7 days.

Furthermore, merges make sketches more practical to use in real world systems. In particular, they allow for simple distributed computation. In a map-reduce framework, each mapper can quickly compute a sketch for its portion of the data, and only a set of small sketches needs to be sent over the network to perform an aggregation at the reducer.

Figure 11:
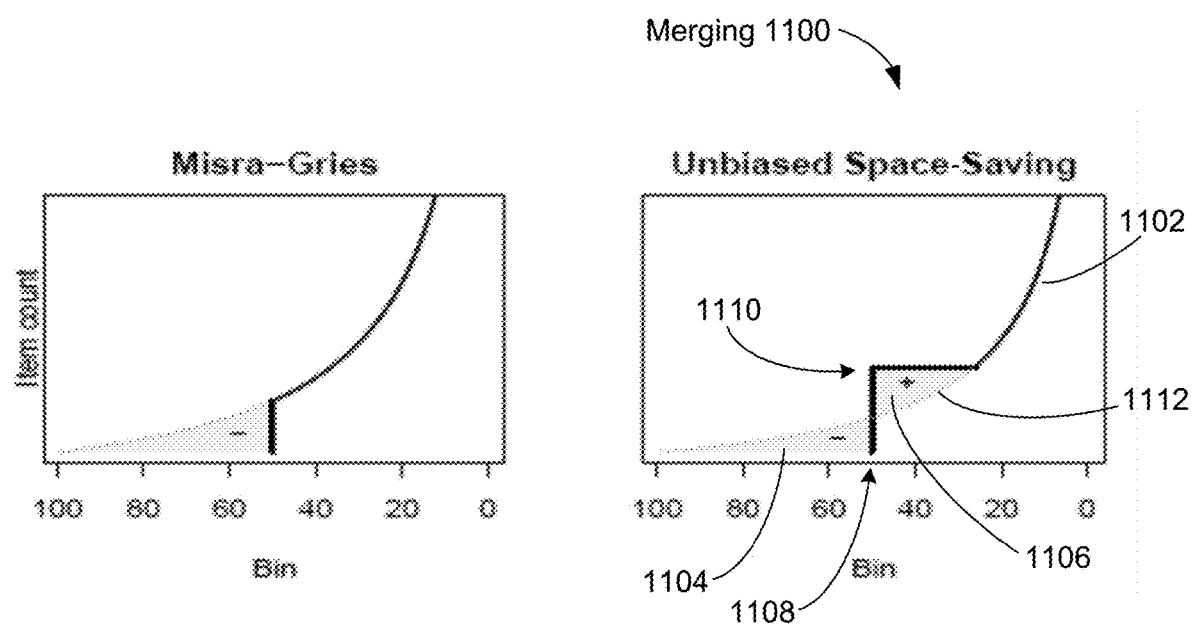
FIG. 11 illustrates merging operations for data sketches, in accordance with some implementations.

Some simple merge operations preserve deterministic error guarantees. The merge process simply soft thresholds by the $(m+1)^{th}$ largest counter so that at most m nonzero counters are left. That is, combine bins from the two sketches that have the same key values, and eliminate the combined bins starting with the $(m+1)^{th}$ largest. In other sketches, such as Misra-Gries, the data for the small combined bins is just thrown out. In the merge operation for Unbiased Space-Saving, however, the process moves the "mass" from infrequent items to moderately frequent items, as illustrated in FIG. 11. This process loses the ability to pick those items as frequent items, but provides unbiased estimates for the counts in the tail.

FIG. 11 illustrates a process for merging (1110) two or more distinct sketches. As shown in FIG. 11, when two or more distinct sketches are combined, the result is more bins than specified for the sketch. The upper part 1102 of the curve represents the bins with high item counts. The dotted extension 1112 indicates the item counts for the remaining bins before any adjustments are made (i.e., just adding together bin counts for bins that have the same key value).

The vertical line 1108 it at the cut point between the m bins with the highest counts (to the right of the vertical line), and the remainder of the bins to the left of the vertical line. Because the sketch is limited to m bins, the temporary bins to the left of the vertical line will be removed. Some alternative merging techniques just throw away the counts from the extra bins, as illustrated in the Misra-Gries graph. Merging in the Unbiased Space-Saving sketch, however, moves the extra counts 1104 into bins that will be kept 1106. In some implementations, the extra counts are distributed among the bins with the lowest counts so that there are multiple stored bins with this small count. As illustrated in FIG. 11, the smallest count 1110 is shared by multiple bins. This process for the Unbiased Space-Saving merge preserves the total expected count in the sketch rather than biasing it downward.

The trade-off for such an unbiased merge operation is that the sketch may detect fewer of the top items by frequency than the biased Misra-Gries merge. Rather than truncating and preserving more of the "head" of the distribution, the process moves "mass" 1104 from the tail closer to the head.

The merge operation can be performed in various ways. In some implementations, merging two sketches includes designating one of the sketches as the starter (e.g., the one with the greatest total count), and treating the items from the second sketch similarly to the way individual new rows are handled when building a new sketch from scratch. In particular, when a "new" item from the second sketch matches an item from the first sketch, the counts are added. When a new item from the second sketch does not match any item from the first sketch, the count for the new item updates the bin in the first sketch having smallest count. In this case, however, the probability of updating the label depends on both the count c in the smallest bin of the first sketch and the count d for the new item. That is, the label is updated with probability d/(c+d). In this merging process, the items in the second sketch can be processed in various orders (e.g., largest to smallest or random).

In some implementations, a merge operation uses the following process, which can be used to combine two or more distinct data sketches. First, matching items from the multiple sketches have their counts summed, and all of the bins are considered together. Once this is done, the bins are ordered (e.g., indexed) based on descending order by count.

Designating the counts as $c_1 \geq c_2 \geq c_3 \geq \ldots$, identify the largest count $c_{m+1}$ that is not among the m largest bins. Next, find the largest index i such that $$\frac{(c_i + c_{i+1} + \ldots + c_{m+1})}{m+1-i} \leq c_{i-1}$$

Label the quantity on the left as $\mu$. Out of the bins $\{i, i+1, \ldots, m+1\}$, one of these will be removed, and the count distributed to the other bins in this set. For each index $j=i, i+1, \ldots, m+1$, the probability of removing the jth bin is $$1 - \frac{c_j}{\mu}$$

One can easily verify that the sum of these probabilities is 1. Note that these probabilities are not independent; exactly one of the bins will be selected for removal. Assume the selected bin for removal has index k. All of the other bins with index values in the range $\{i, i+1, \ldots, m+1\}$ have their counter values set to $\mu$. It is easy to verify that this process exactly reallocates the bin counts, and there is one less bin. In addition, because $\mu \leq c_{i-1}$, the descending order of the bin counts is preserved. The process is then repeated until there are only m total bins. Note that the counts are not necessarily integers after applying this merging process.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method of data sketching, comprising:
at a computer system having one or more processors and memory storing one or more programs configured for execution by the one or more processors:
selecting a plurality of data fields from a data source having a plurality of data rows;
determining a number N of bins for aggregating rows of the data source;
allocating storage in the memory for N bins, each bin comprising storage space for a key value and an associated counter value, with the associated counter value initialized to zero; and
sequentially processing the plurality of rows in the data source, including;
for each row, computing a respective key value for the respective row using data values for the selected plurality of data fields in the respective row, the plurality of rows including at least a first subset, a second subset, and a third subset;
for each row in the first subset of the plurality of rows:
determining that the respective key value matches a key value for a respective first bin; and
incrementing the counter value for the respective first bin;
for each row in the second subset of the plurality of rows:
determining that the respective key value does not match any bin key value and that there exists one or more bins having a counter value of zero;
selecting a respective second bin having a counter value of zero;
setting the key value of the respective second bin to be the respective key value; and
setting the counter value of the respective second bin to be one; and
for each row in the third subset of the plurality of rows:
determining that the respective key value does not match any bin key value and that all of the N bins have non-zero counter values;
identifying a respective third bin with a smallest counter value c;
incrementing the counter value of the respective third bin; and
with probability $1/(1+c)$, replacing the key value of the respective third bin with the respective key value, including:
generating a respective pseudorandom number in a first range, the first range including a subrange corresponding to the probability $1/(1+c)$:
in accordance with a determination that the respective pseudorandom number is within the subrange, replacing the key value of the respective third bin with the respective key value for the respective row; and
in accordance with a determination that the respective pseudorandom number is outside the subrange, retaining the key value of the respective third bin.

2. The method of claim 1, wherein the data source is streaming.

3. The method of claim 1, further comprising:
receiving a query from a client to identify M frequent items from the N bins, wherein M is a positive integer less than N;
in response to receiving the query:
selecting, from the N bins, M bins having the largest counter values; and
returning the key values of the selected M bins to the client.

4. The method of claim 1, further comprising:
receiving a query from a client to estimate a count of rows from the data source satisfying a user-specified filter condition;
in response to receiving the query:
determining a subset of the bins whose key values satisfy the user-specified filter condition;

computing a sum of the counter values for the bins in the determined subset; and returning, to the client, the sum as an estimate of the count of rows from the data source satisfying the filter condition.

5. The method of claim 1, wherein determining the number N of bins for aggregating rows of the data source comprises:

receiving user specification of an error limit e for estimating subset sums for the data set;

receiving a user estimate P of a fraction of the rows in the data set that will satisfy expected subset sum filters; and selecting the number N to be a positive integer satisfying $$N \geq \frac{1}{P\varepsilon^2}.$$

6. The method of claim 1, wherein the selected data fields are $f_1, f_2, \ldots, f_k$, and computing the respective key value for the respective row comprises forming a concatenation $f_1(r)+f_2(r)+\ldots+f_k(r)$, where $f_i(r)$ specifies the $f_i$ data field value for the row r for i=1, 2, ..., k, and $f_i(r)$ casts the corresponding data field value as a string when the data type of the data field $f_i$ is not a string.

7. The method of claim 1, wherein the selected data fields are $f_1, f_2, \ldots, f_k$, and computing the respective key value for the respective row comprises forming a k-tuple $(f_1(r), f_2(r), \ldots, f_k(r))$, where $f_i(r)$ specifies the $f_i$ data field value for the row r for i=1, 2, ..., k.

8. The method of claim 1, wherein each bin further comprises storage space for a hash of the bin key value, and matching a respective key value to a key value for a respective bin comprises:

computing a respective hash value of the respective key value; and comparing the respective hash value to bin hash values.

9. The method of claim 1, further comprising partitioning data values for a first data field, of the selected plurality of data fields, into a plurality of distinct partitions, each partition consisting of a respective list or range of data values;

wherein matching the respective key value to a respective bin value comprises:

identifying the data values of the first data field in the respective key value and in the respective bin key value, and determining that the identified data values are in a same partition.

10. A computer system having one or more computing devices, each computing device having one or more processors and memory, wherein the memory stores one or more programs configured for execution by the one or more processors, and the one or more programs comprise instructions for:

selecting a plurality of data fields from a data source having a plurality of data rows;

determining a number N of bins for aggregating rows of the data source;

allocating storage in the memory for N bins, each bin comprising storage space for a key value and an associated counter value, with the associated counter value initialized to zero; and sequentially processing the plurality of rows in the data source, including:

for each row, computing a respective key value for the respective row using data values for the selected plurality of data fields in the respective row, the plurality of rows including at least a first subset, a second subset, and a third subset;

for each row in the first subset of the plurality of rows:

determining that the respective key value matches a key value for a respective first bin; and incrementing the counter value for the respective first bin;

for each row in the second subset of the plurality of rows:

determining that the respective key value does not match any bin key value and that there exists one or more bins having a counter value of zero;

selecting a respective second bin having a counter value of zero;

setting the key value of the respective second bin to be the respective key value; and setting the counter value of the respective second bin to be one; and for each row in the third subset of the plurality of rows:

determining that the respective key value does not match any bin key value and that all of the N bins have non-zero counter values;

identifying a respective third bin with a smallest counter value c;

incrementing the counter value of the respective third bin; and with probability 1/(1+c), replacing the key value of the respective third bin with the respective key value, including:

generating a respective pseudorandom number in a first range, the first range including a subrange corresponding to the probability 1/(1+c):

in accordance with a determination that the respective pseudorandom number is within the subrange, replacing the key value of the respective third bin with the respective key value for the respective row; and in accordance with a determination that the respective pseudorandom number is outside the subrange, retaining the key value of the respective third bin.

11. The computer system of claim 10, wherein the data source is streaming.

12. The computer system of claim 10, wherein the one or more programs further comprise instructions for:

receiving a query from a client to identify M frequent items from the N bins, wherein M is a positive integer less than N;

in response to receiving the query:

selecting, from the N bins, M bins having the largest counter values; and returning the key values of the selected M bins to the client.

13. The computer system of claim 10, wherein the one or more programs further comprise instructions for:

receiving a query from a client to estimate a count of rows from the data source satisfying a user-specified filter condition;

in response to receiving the query:

determining a subset of the bins whose key values satisfy the user-specified filter condition;

computing a sum of the counter values for the bins in the determined subset; and returning, to the client, the sum as an estimate of the count of rows from the data source satisfying the filter condition.

14. The computer system of claim 10, wherein determining the number N of bins for aggregating rows of the data source comprises:
  receiving user specification of an error limit e for estimating subset sums for the data set;
  receiving a user estimate P of a fraction of the rows in the data set that will satisfy expected subset sum filters; and
  selecting the number N to be a positive integer satisfying $$N \geq \frac{1}{P\varepsilon^2}.$$

15. The computer system of claim 10, wherein the selected data fields are $f_1, f_2, \ldots, f_k$, and computing the respective key value for the respective row comprises forming a concatenation $f_1(r)+f_2(r)+ \ldots +f_k(r)$, where $f_i(r)$ specifies the $f_i$ data field value for the row r for i=1, 2, ..., k, and $f_i(r)$ casts the corresponding data field value as a string when the data type of the data field $f_i$ is not a string.

16. The computer system of claim 10, wherein the selected data fields are $f_1, f_2, \ldots f_k$, and computing the respective key value for the respective row comprises forming a k-tuple $(f_1(r), f_2(r), \ldots, f_k(r))$, where $f_i(r)$ specifies the $f_i$ data field value for the row r for i=1, 2, ..., k.

17. The computer system of claim 10, wherein each bin further comprises storage space for a hash of the bin key value, and matching a respective key value to a key value for a respective bin comprises:
  computing a respective hash value of the respective key value; and
  comparing the respective hash value to bin hash values.

18. The computer system of claim 10, wherein the one or more programs further comprise instructions for partitioning data values for a first data field, of the selected plurality of data fields, into a plurality of distinct partitions, each partition consisting of a respective list or range of data values;
  wherein matching the respective key value to a respective bin value comprises:
    identifying the data values of the first data field in the respective key value and in the respective bin key value, and determining that the identified data values are in a same partition.

19. A method of data sketching, comprising:
  at a computer system having one or more processors and memory storing one or more programs configured for execution by the one or more processors:
  selecting a plurality of data fields from a data source having a plurality of data rows and selecting a summation data field, having a numeric data type, from the data source;
  determining a number N of bins for aggregating rows of the data source;
  allocating storage in the memory for N bins, each bin comprising storage space for a key value and an associated magnitude, with the associated magnitude initialized to zero; and
  sequentially processing the plurality of rows in the data source, including:
    for each row, computing a respective key value for the respective row using data values for the selected plurality of data fields in the respective row, and identifying a respective summation value s comprising a data value for the summation data field in the respective row, the plurality of rows including at least a first subset, a second subset, and a third subset;
    for each row in the first subset of the plurality of rows:
      determining that the respective key value matches a key value for a respective first bin; and
      adding the respective summation value to the magnitude for the respective bin;
    for each row in the second subset of the plurality of rows:
      determining that the respective key value does not match any bin key value and there exists one or more bins having a magnitude of zero,
      selecting a respective second bin having a magnitude of zero;
      setting the key value of the respective second bin to be the respective key value; and
      setting the magnitude of the respective second bin to be the respective summation value;
    for each row in the third subset of the plurality of rows:
      determining that the respective key value does not match any bin key value and that all of the N bins have non-zero magnitudes;
      identifying a respective third bin with a smallest magnitude c;
      adding the respective summation value to the magnitude of the respective third bin; and
      with probability s/(s+c), replacing the key value of the respective third bin with the respective key value, including:
        generating a respective pseudorandom number in a first range, the first range including a subrange corresponding to the probability s/(s+c):
        in accordance with a determination that the respective pseudorandom number is within the subrange, replacing the key value of the respective third bin with the respective key value for the respective row; and
        in accordance with a determination that the respective pseudorandom number is outside the subrange, retaining the key value of the respective third bin.

20. The method of claim 19, wherein each bin further comprises storage space for a hash of the bin key value, and matching a respective key value to a key value for a respective bin comprises:
  computing a respective hash value of the respective key value; and
  comparing the respective hash value to bin hash values.

* * * * *